United States Patent
Blom et al.

(10) Patent No.: US 10,753,955 B2
(45) Date of Patent: Aug. 25, 2020

(54) SYSTEMS AND METHOD FOR ADVANCED ADDITIVE MANUFACTURING

(71) Applicant: General Electric Company, Schenectady, NY (US)

(72) Inventors: Rogier Sebastiaan Blom, Clifton Park, NY (US); John Freer, Saratoga Springs, NY (US); Dean Michael Robinson, Schenectady, NY (US); Subhrajit Roychowdhury, Schenectady, NY (US); Harry Kirk Mathews, Jr., Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 187 days.

(21) Appl. No.: 15/638,943

(22) Filed: Jun. 30, 2017

(65) Prior Publication Data

US 2019/0004079 A1    Jan. 3, 2019

(51) Int. Cl.
| | | |
|---|---|---|
| *B33Y 50/02* | (2015.01) | |
| *G01N 35/10* | (2006.01) | |
| *B22F 3/105* | (2006.01) | |
| *G06F 19/00* | (2018.01) | |

(Continued)

(52) U.S. Cl.
CPC ........ *G01N 35/1011* (2013.01); *B22F 3/1055* (2013.01); *B33Y 50/02* (2014.12); *G06F 19/00* (2013.01); *B22F 2003/1057* (2013.01); *B33Y 10/00* (2014.12); *B33Y 30/00* (2014.12)

(58) Field of Classification Search
CPC .................................................... B23F 3/1055
See application file for complete search history.

(56) References Cited

U.S. PATENT DOCUMENTS

| | | | | |
|---|---|---|---|---|
| 5,113,338 A | * | 5/1992 | Seki ................ | G05B 19/40935 |
| | | | | 700/180 |
| 6,571,255 B1 | * | 5/2003 | Gonsalves .......... | G11B 27/034 |
| 8,822,875 B2 | | 9/2014 | Webster et al. | |

(Continued)

OTHER PUBLICATIONS

Kruth, J.P. et al., "Feedback Control of Selective Laser Melting," Katholieke Universiteit Leuven, Department of Mechanical Engineering, Division PMA, Belgium, 7 pp.

(Continued)

*Primary Examiner* — Mohammad Ali
*Assistant Examiner* — Vincent W Chang
(74) *Attorney, Agent, or Firm* — Armstrong Teasdale LLP

(57) ABSTRACT

A manufacturing computer device for dynamically adapting additive manufacturing of a part is provided. The manufacturing computer device includes at least one processor in communication with at least one memory device. The at least one memory device stores a build file for building the part including a plurality of geometries that each include one or more values of a first build parameter. The processor is programmed to receive sensor information of a build of the part by a machine, compare the sensor information for each geometry of the plurality of geometries to the corresponding one or more values of the first build parameter, determine one or more values for a second build parameter for each of the geometries based on the one or more differences, and generate an updated build file for the part including the one or more values for the second build parameter.

15 Claims, 12 Drawing Sheets

(51) Int. Cl.
*B33Y 10/00* (2015.01)
*B33Y 30/00* (2015.01)

(56) References Cited

U.S. PATENT DOCUMENTS

| | | |
|---|---|---|
| 8,974,717 B2 | 3/2015 | Maguire et al. |
| 9,233,504 B2 | 1/2016 | Douglas et al. |
| 9,254,535 B2 | 2/2016 | Buller et al. |
| 9,321,215 B2 | 4/2016 | Dudley |
| 9,346,127 B2 | 5/2016 | Buller et al. |
| 2013/0327917 A1 | 12/2013 | Steiner et al. |
| 2014/0263209 A1 | 9/2014 | Burris et al. |
| 2015/0021815 A1 | 1/2015 | Albrecht et al. |
| 2015/0048064 A1* | 2/2015 | Cheverton ............ B22F 3/1055 219/121.63 |
| 2015/0097308 A1 | 4/2015 | Batchelder et al. |
| 2015/0105889 A1 | 4/2015 | Tsai |
| 2015/0165524 A1 | 6/2015 | Ljungblad et al. |
| 2015/0165693 A1 | 6/2015 | Sagoo et al. |
| 2015/0197064 A1 | 7/2015 | Walker et al. |
| 2015/0202826 A1 | 7/2015 | Paternoster et al. |
| 2015/0269290 A1 | 9/2015 | Nelaturi et al. |
| 2016/0052058 A1 | 2/2016 | Bonke et al. |
| 2016/0059490 A1 | 3/2016 | Stafford |
| 2016/0114431 A1* | 4/2016 | Cheverton ........... B23K 26/342 219/76.1 |
| 2016/0144575 A1 | 5/2016 | Rizzo, Jr. et al. |
| 2016/0158889 A1 | 6/2016 | Carter et al. |
| 2016/0167160 A1 | 6/2016 | Hellestam |
| 2016/0167303 A1 | 6/2016 | Petelet |
| 2016/0207109 A1 | 7/2016 | Buller et al. |
| 2016/0214324 A1 | 7/2016 | Schouwenburg |
| 2017/0057172 A1* | 3/2017 | Keicher ................ B33Y 50/02 |
| 2017/0177608 A1* | 6/2017 | Cismas ................ G06F 16/176 |

OTHER PUBLICATIONS

Mathews, H. Kirk et al., "Intelligent Control for Additive Manufacturing (iCAM): Iterative Learning Control of Melt Pool for Powder Bed Fusion Systems", vol. 1: White Paper submitted to Digital Manufacturing and Design Innovation Institute, Chicago, IL, 2015, 34 pp.

* cited by examiner

SYSTEMS AND METHOD FOR ADVANCED ADDITIVE MANUFACTURING

BACKGROUND

The field of the disclosure relates generally to additive manufacturing and, more particularly, to systems and method for dynamically adapting additive manufacturing of a part, build or both.

Many additive manufacturing systems (also known as three dimensional (3D) printers) generate three-dimensional objects through a layer-by-layer process. The system generates an object through placing successive layers of a material based on computer control. At least some additive manufacturing systems involve the buildup of a powdered material to make a component. This method can produce complex components from expensive materials at a reduced cost and with improved manufacturing efficiency. At least some known additive manufacturing systems, such as Direct Metal Laser Melting (DMLM) systems, fabricate components using a laser device and a powder material, such as, without limitation, a powdered metal. The laser device generates a laser beam that melts the powder material in and around the area where the laser beam is incident on the powder material, resulting in a melt pool. In some known DMLM systems, component quality may be impacted by excess heat and/or variation in heat being transferred to the metal powder by the laser device within the melt pool.

In some known DMLM systems, component surface quality, particularly of overhanging or downward facing surfaces, is reduced due to the variation in conductive heat transfer between the powdered metal and the surrounding solid material of the component. As a result, local overheating may occur, particularly at the overhanging surfaces. The melt pool produced by the laser device may become too large resulting in the melted metal spreading into the surrounding powdered metal as well as the melt pool penetrating deeper into the powder bed, pulling in additional powder into the melt pool. The increased melt pool size and depth, and the flow of molten metal may generally result in a poor surface finish of the overhang or downward facing surface.

Other issues with variations in the material and the application of the material may also occur during manufacturing based on a plurality of factors, which may lead to the object being unusable.

BRIEF DESCRIPTION

In one aspect, a manufacturing computer device for dynamically adapting additive manufacturing of a part is provided. The manufacturing computer device includes at least one processor in communication with at least one memory device. The at least one memory device stores a build file for building the part including a plurality of geometries that each include one or more values of a first build parameter. The manufacturing computer device is configured to receive sensor information of a build of the part by a machine using the build file, compare the sensor information for each geometry of the plurality of geometries to the corresponding one or more values of the first build parameter to determine one or more differences, determine one or more values for a second build parameter for each of the geometries based on the one or more differences, and generate an updated build file for the part including the one or more values for the second build parameter.

In another aspect, a method for dynamically adapting additive manufacturing of a part is provided. The method is implemented using a manufacturing computer device. The manufacturing computer device includes a processor in communication with a memory. The method includes storing a build file for building the part including a plurality of geometries that each include one or more values of a first build parameter, receiving sensor information of a build of the part by a machine using the build file, comparing the sensor information for each geometry of the plurality of geometries to the corresponding one or more values of the first build parameter to determine one or more differences, determining one or more values for a second build parameter for each of the geometries based on the one or more differences, generating an updated build file for the part including the one or more values for the second build parameter, and transmitting the updated build file to the machine.

In yet another aspect, a system for dynamically adapting additive manufacturing of a part is provided. The system includes an additive manufacturing machine configured to build the part based on a build file, a plurality of sensors configured to monitor building of the part, and a manufacturing computer device including at least one processor in communication with at least one memory device. The manufacturing computer device is configured to store a build file for building the part including a plurality of geometries that each include one or more values of a first build parameter, receive, from said plurality of sensors, sensor information of a build of the part by said additive manufacturing machine using the build file, compare the sensor information for each geometry of the plurality of geometries to the corresponding one or more values of the first build parameter to determine one or more differences, determine one or more values for a second build parameter for each of the geometries based on the one or more differences, generate an updated build file for the part including the one or more values for the second build parameter, and transmit the updated build file to said additive manufacturing machine.

In still another aspect, a manufacturing computer device for dynamically adapting additive manufacturing of a part is provided. The manufacturing computer device includes at least one processor in communication with at least one memory device. The at least one memory device stores a build file for building the part including a plurality of geometries that each include one or more build parameters. The manufacturing computer device is configured to receive sensor information of a first geometry being built from a build of the part in progress, determine one or more adjustments to the one or more build parameters for the first geometry based on the sensor information, identify one or more subsequent geometries of the plurality of geometries to be built that are similar to the first geometry, and adjust one or more build parameters of the one or more subsequent geometries based on the one or more adjustments.

In a further aspect, a method for dynamically adapting additive manufacturing of a part is provided. The method is implemented using a manufacturing computer device. The manufacturing computer device includes a processor in communication with a memory. The method includes storing a build file for building the part including a plurality of geometries that each include one or more build parameters, receiving sensor information of a first geometry being built from a build of the part in progress, determining one or more adjustments to the one or more build parameters for the first geometry based on the sensor information, identifying one or more subsequent geometries of the plurality of geometries to be built that are similar to the first geometry, adjusting, in the build file, the one or more build parameters of the one or more subsequent geometries based on the one or more adjustments, and transmitting the adjusted build file to a machine currently manufacturing the part.

In a still further aspect, a system for dynamically adapting additive manufacturing of a part is provided. The system includes an additive manufacturing machine configured to build the part based on a build file, a plurality of sensors configured to monitor building the part, and a manufacturing computer device comprising at least one processor in communication with at least one memory device. The manufacturing computer device is configured to store the build file for building the part including a plurality of geometries that each include one or more build parameters, receive sensor information of a first geometry being built from a build of the part in progress from said plurality of sensors, determine one or more adjustments to the one or more build parameters for the first geometry based on the sensor information, identify one or more subsequent geometries of the plurality of geometries to be built that are similar to the first geometry, adjust, in the build file, the one or more build parameters of the one or more subsequent geometries based on the one or more adjustments, and transmit the adjusted build file to said additive manufacturing machine.

In another aspect of the device for dynamically creating or modifying at least a portion of an additive manufacturing build for making the part, wherein the device may in direct or indirect communication with one or more additive manufacturing machines that use one or more build parameters, the device may be configured to: analyze a plurality of build information pertaining to the part, wherein a portion of the build information pertains to pre-existing data about the part, and wherein a portion of the build information pertains to data that is non-pre-existing data about the part; assess whether one or more differences between the pre-existing data and the non-pre-existing data will result in a deviation from, or improvement to, the part, the additive manufacturing build, or both; automatically create or modify, one or more of the build parameters of the part, at least a portion of the additive manufacturing build, or a combination thereof, based on the assessment of the one more differences. The assessment may comprise a virtual control loop and the loop may be iterative. In some embodiments, the non-pre-existing data may comprise measured data, such as, for example, data measured during the additive manufacturing build of the part by the additive manufacturing machine. The non-pre-existing data may be artificial. In some embodiments, the pre-existing data may comprise measured data, such as, for example, data measured during the additive manufacturing build of the part by the additive manufacturing machine. The device may be configured to create or modify one or more of the build parameters of the part, at least a portion of the additive manufacturing build, or a combination thereof, while the part is being built by the one or additive manufacturing machines. The device may further comprise a communication component for communicating the created or modified one or more of the build parameters of the part, at least a portion of the additive manufacturing build, or a combination thereof, to the one or more additive manufacturing machines.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
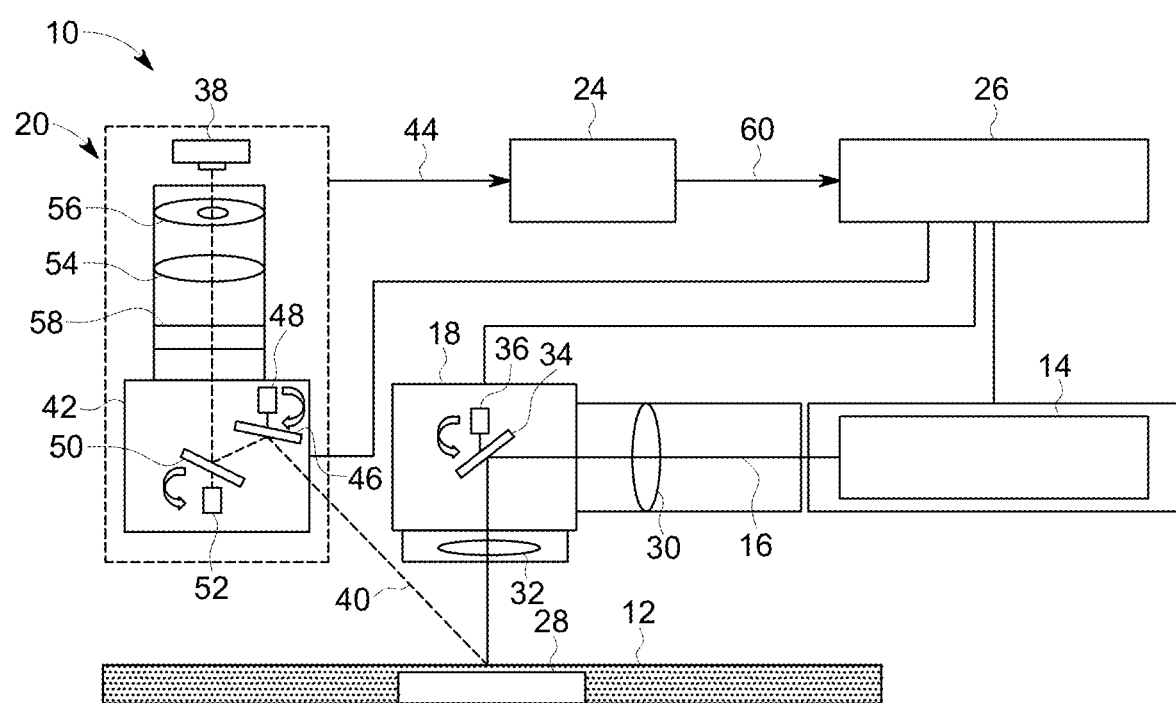
FIG. 1 is a schematic view of an exemplary additive manufacturing system illustrated in the form of a direct metal laser melting (DMLM) system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer", and related terms, e.g., "processing device", "computing device", and controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In some of the embodiments described herein, these activities and events occur substantially instantaneously. In some embodiments, the term "real-time" refers to real-time control systems. Real-time control systems are closed-loop control systems where the process has a tight time window to gather data, process that data, and update the system. If the time window is missed, then the stability of the system is potentially degraded. The size of this time window is determined by the dynamics of the process under control, the latency of the system, and the specific control algorithm used.

As used herein, the term geometry refers to any section, characteristic, or feature of a part or build. A geometry may be in a single layer, a build of an individual part, a section of a part, a scan line, a time series of a build, and a geometric feature of a part. In some embodiments, for example, a geometry may comprise the variations in power or material that may be required for an additive manufacturing machine to manufacture the geometry.

The additive manufacturing system described herein provides a method for dynamically adapting additive manufacturing of a part based on performance and/or past performance of builds of the part. The systems and method may use preexisting information and non-pre-existing data that is relevant to parts to be additively manufactured including building of the parts. Specifically, one or more of the embodiments described herein comprise a computing device that is configured to assess information about a part including builds of the part and generate modifications, without limitation, to build processes, build parameters, and build files, to improve or change the part and building of the part. The computing device may use build information such as, but not limited to, build parameters, geometries, sensor data, material data, system data, quality control or assurance data, and performance data of the part, to update a build file to improve the quality of the final part or to increase efficiencies, improve, or modify other aspects of the parts or builds. The computing device may use one more of preexisting data, whether measured, modeled or virtual data, that is relevant to the part including building of the part, to modify the part, including, for example the starting shape of the part, build file or build directly. The data provided and/or used may be feedforward, feedback, pre- or post-build, modeled and virtual.

Some embodiments of the computing device breaks the build file apart into geometries, where a build file may include multiple copies of the same geometry, and updates each copy of the same geometry based on the previous builds of that geometry. In some embodiments, the computer device updates the build file in real-time while a part is being built. In other embodiments, the computer device updates or modifies the part, build file and/or build directly, before, during or after the part is complete. The systems and method described herein, in part, allow for reducing the number of times that a part must be built to achieve an acceptable or ideal part. The systems and method allow for a part, build or build file to be updated or modified prior to, during, or after, a build begins or ends, for any purpose that is beneficial. The computer device may, for example, be the additive manufacturing system itself or another computer device that can communicate with the additive manufacturing system locally, remotely, or a removable or interchangeable digital storage medium.

FIG. 1 is a schematic view of an exemplary additive manufacturing system 10 illustrated in the form of a direct metal laser melting (DMLM) system. Although the embodiments herein are described with reference to a DMLM system, this disclosure also applies to other types of additive manufacturing systems and methods including, for example, and without limitation, vat photopolymerization, powder bed fusion, binder jetting, material jetting, sheet lamination, material extrusion, directed energy deposition and hybrid systems. These systems and methods may include, for example, and without limitation, stereolithography; digital light processing; scan, spin, and selectively photocure; continuous liquid interface production; selective laser sintering; direct metal laser sintering; selective laser melting; electron beam melting; selective heat sintering; multi jet fusion; smooth curvatures printing; multi jet modeling; laminated object manufacture; selective deposition lamination; ultrasonic additive manufacturing; fused filament fabrication; fused deposition modeling; laser metal deposition; laser engineered net shaping; direct metal deposition; hybrid systems; and combinations of these methods and systems. These methods and systems may employ, for example, and without limitation, all forms of electromagnetic radiation, heating, sintering, melting, curing, binding, consolidating, pressing, embedding, and combinations thereof.

These methods and systems employ materials including, for example, and without limitation, polymers, plastics, metals, ceramics, sand, glass, waxes, fibers, biological matter, composites, and hybrids of these materials. These materials may be used in these methods and systems in a variety of forms as appropriate for a given material and method or system, including for example without limitation, liquids, solids, powders, sheets, foils, tapes, filaments, pellets, liquids, slurries, wires, atomized, pastes, and combinations of these forms.

In the exemplary embodiment, system 10 comprises a build platform 12, a laser, melting or heating device 14 configured to generate one or more laser or electronic beams or energy 16, one or more scanning devices 18 configured to selectively direct or move the beam or energy 16 across build platform 12, and an optical or other monitoring system 20 for monitoring a melt pool. The exemplary system 10 further comprises a computing device 24 and a controller 26 configured to control one or more components of system 10, as described in more detail herein.

Build platform 12 includes a powdered feedstock material that is melted and re-solidified during the additive manufacturing process to build a solid part 28. Build platform 12 includes materials suitable for forming such components, including, without limitation, gas atomized alloys of cobalt, iron, aluminum, titanium, nickel, and combinations thereof. In other embodiments, build platform 12 may include any suitable type of powdered metal material. In yet other embodiments, build platform 12 includes any suitable build material and form that enables system 10 to function.

Device 14 is configured to generate energy source 16 of sufficient energy to at least partially heat or melt the build material of build platform 12. In this exemplary embodiment, laser device 14 is an yttrium-based solid state laser configured to emit a laser beam having a wavelength of about 1070 nanometers (nm). In other embodiments, device 14 includes any suitable type of laser, or laser fiber coupled to an energy source such as a laser diode, that enables system 10 to function, such as a carbon dioxide ($CO_2$) laser. Further, although system 10 is shown and described as including a single device 14, system 10 may comprise more than one device or arrays, with varying and/or selectable energy levels. System 10 may comprise any combination of devices that enable system 10 to function.

As shown in FIG. 1, in one exemplary embodiment, device 14 is optically coupled to optical elements 30 and 32 that facilitate focusing laser beam 16 on build platform 12. In the exemplary embodiment, optical elements 30 and 32 include a beam collimator 30 disposed between the laser device 14 and first scanning device 18, and an F-theta lens 32 disposed between the first scanning device 18 and build platform 12. System 10 may comprise any suitable type and arrangement of optical elements that provides collimated and/or focused energy onto build platform 12.

First scanning device 18 is configured to direct energy source 16 across selective portions of build platform 12 to create part 28. In the exemplary embodiment, first scanning device 18 is a galvanometer scanning device including a mirror 34 operatively coupled to a galvanometer-controlled motor 36 (broadly, an actuator). Motor 36 is configured to move (specifically, rotate) mirror 34 in response to signals received from controller 26, and thereby deflect laser beam 16 across selective portions of build platform 12. Mirror 34 includes any suitable configuration that enables mirror 34 to deflect energy source 16 towards build platform 12. In some embodiments, mirror 34 includes a reflective coating that has a reflectance spectrum that corresponds to the wavelength of laser beam 16.

Although first scanning device 18 is illustrated with mirror 34 and motor 36, first scanning device 18 may comprise any suitable number and types of reflectors or directional devices, gantries, and motors that enable one or more scanning devices 18 to function and move. In one embodiment, for example, first scanning device 18 includes two mirrors and two galvanometer-controlled motors, each operatively coupled to one of the mirrors. In yet other embodiments, first scanning device 18 includes any suitable scanning device or that enables system 10 to function as described herein, such as, for example, two-dimension (2D) scan galvanometers, three-dimension (3D) scan galvanometers, and dynamic focusing galvanometers.

Optical system 20 is configured to detect electromagnetic radiation generated by melt pool 22 and transmit information about melt pool 22 to computing device 24. In the exemplary embodiment, optical system 20 includes an optical detector 38 configured to detect electromagnetic radiation 40 (also referred to as "EM radiation") generated by melt pool 22, and a second scanning device 42 configured to direct electromagnetic radiation 40 generated by melt pool 22 to optical detector 38. Second scanning device 42 is separate from first scanning device 18, and is dedicated to directing EM radiation 40 generated by melt pool 22 to optical detector 38, rather than directing laser beam 16 towards build platform 12. As such, second scanning device 42 is also referred to herein as a "dedicated" scanning device. In the exemplary embodiment, first scanning device 18 may also be referred to as a dedicated scanning device because it is dedicated to scanning laser beam 16 across build platform 12 and is not used in detecting EM radiation 40 generated by melt pool 22. In other embodiments, first scanning device 18 may also be used in detecting EM radiation 40 generated by melt pool 22, and thus, may not be a dedicated scanning device. Under normal operation, optical elements within optical system 20 do not undergo thermal lensing because the EM radiation transmitted through optical system 20 has relatively low power.

Optical detector 38 is configured to detect EM radiation 40 generated by melt pool 22. More specifically, optical detector 38 is configured to receive EM radiation 40 generated by melt pool 22, and generate an electrical signal 44 in response thereto. Optical detector 38 is communicatively coupled to computing device 24, and is configured to transmit electrical signal 44 to computing device 24.

Optical detector 38 includes any suitable optical detector that enables optical system 20 to function as described herein, including, for example and without limitation, a photomultiplier tube, a photodiode, an infrared camera, a charged-couple device (CCD) camera, a CMOS camera, a pyrometer, or a high-speed visible-light camera. Although optical system 20 is shown and described as including a single optical detector 38, optical system 20 includes any suitable number and type of optical detectors that enables system 10 to function as described herein. In one embodiment, for example, optical system 20 includes a first optical detector configured to detect EM radiation within an infrared spectrum, and a second optical detector configured to detect EM radiation within a visible-light spectrum. In embodiments including more than one optical detector, optical system 20 includes a beam splitter (not shown) configured to divide and deflect EM radiation 40 from melt pool 22 to a corresponding optical detector.

While optical system 20 is described as including "optical" detectors for EM radiation 40 generated by melt pool 22, it should be noted that use of the term "optical" is not to be equated with the term "visible." Rather, optical system 20 is configured to capture a wide spectral range of EM radiation and will depend on the additive manufacturing method or system employed. For example, first optical detector 38 is sensitive to light with wavelengths in the ultraviolet spectrum (about 200-400 nm), the visible spectrum (about 400-700 nm), the near-infrared spectrum (about 700-1,200 nm), and the infrared spectrum (about 1,200-10,000 nm). Further, because the type of EM radiation 40 emitted by melt pool 22 depends on the temperature of melt pool 22, optical system 20 is capable of monitoring and measuring both a size and a temperature of melt pool 22.

Second scanning device 42 is configured to direct EM radiation 40 generated by melt pool 22 to first optical detector 38. In the exemplary embodiment, second scanning device 42 is a galvanometer scanning device including a first mirror 46 operatively coupled to a first galvanometer-controlled motor 48 (broadly, an actuator), and a second mirror 50 operatively coupled to a second galvanometer-controlled motor 52 (broadly, an actuator). First motor 48 and second motor 52 are configured to move (specifically, rotate) first mirror 46 and second mirror 50, respectively, in response to signals received from controller 26 to deflect EM radiation 40 from melt pool 22 to first optical detector 38. First mirror 46 and second mirror 50 has any suitable configuration that enables first mirror 46 and second mirror 50 to deflect EM radiation 40 generated by melt pool 22. In some embodiments, one or both of first mirror 46 and second mirror 50 includes a reflective coating that has a reflectance spectrum that corresponds to EM radiation that first optical detector 38 is configured to detect.

Although second scanning device 42 is illustrated and described as including two mirrors and two motors, second scanning device 42 includes any suitable number of mirrors and motors that enable optical system 20 to function as described herein. Further, second scanning device 42 includes any suitable scanning device that enables optical system 20 to function as described herein, such as, for example, two-dimension (2D) scan galvanometers, three-dimension (3D) scan galvanometers, and dynamic focusing galvanometers.

Computing device 24 includes a computer system that includes at least one processor (not shown in FIG. 1) that executes executable instructions to operate system 10. Computing device 24 includes, for example, a calibration model of system 10 and an electronic computer build file associated with a component, such as part 28. The calibration model includes, without limitation, an expected or desired melt pool size and temperature under a given set of operating conditions (e.g., a power of laser device 14) of system 10. In the exemplary embodiment, the melt pool size includes one or more dimensions of the melt pool, such as, but not limited to, length, width, depth, area, and volume. In the exemplary embodiment, the melt pool temperature profile represents the temperature of the melt pool at certain points in the melt pool, such as the center. In other embodiments, the melt pool temperature profile represents a measured temperature from samples of the melt pool or from a function of the 2D/3D temperature distribution profile.

The build file includes build parameters that are used to control one or more components of one or more systems, such as, without limitation, system 10, or to otherwise build parts. The build parameters will depend on the additive manufacturing methods or systems employed and the materials making up the parts. Build parameters may comprise one or more of, without limitation, power, speed, orientation, position of energy sources, galvos, mirrors, scanners, sensors, detectors, conveyors, build plates, and material applicators and removers. Build parameters may also comprise one or more of, without limitation, materials used by the system to carry out the methods such as gases, gas pressures, and flow of gases; melt pool sizes and melt pool temperature profiles; materials making up the parts themselves and interim part materials; speed and method of applying the materials during the builds; and the starting and interim-build shapes of the parts.

In an example in which a DMLM method or system is employed, build parameters may include one or more of, without limitation, a power of laser or energy device 14, a scan speed of first scanning device 18 (also known as galvo speed, mirror speed, and/or scanning speed of laser device 14), a position and orientation of first scanning device 18 (specifically, mirror 34), a scan speed of second scanning device 42, a position and orientation of second scanning device 42 (specifically, first mirror 46 and second mirror 50), a desired melt pool size, a desired melt pool temperature profile, gases, gas pressure, and flow of gases, metal powders and other materials making up the parts themselves, interim part materials, speed and method of applying the powders and other materials, and the starting and interim-build shape of the parts.

In the exemplary embodiment, computing device 24 and controller 26 are shown as separate devices. In other embodiments, computing device 24 and controller 26 are combined as a single device that operates as both computing device 24 and controller 26 as each are described herein. In other embodiments, the model includes the details of the process of manufacturing part 28. In some embodiments, the build parameters are stored separately from the plurality of geometries (e.g., the CAD file that describes the part to be built). In these embodiments, the build file includes a plurality of build parameters that are stored in the memory of computing device 24 or controller 26 and the plurality of geometries that are stored separately. In these embodiments, system 10 combines the build parameters with the plurality of geometries as the build is occurring.

In the exemplary embodiment, computing device 24 is also configured to operate at least partially as a data acquisition device and to monitor the operation of system 10 during fabrication of part 28. In one embodiment, for example, computing device 24 receives and processes electrical signals 44 from first optical detector 38. Computing device 24 stores information associated with melt pool 22 based on electrical signals 44, which is used to facilitate controlling and refining a build process for system 10 or for a specific component built by system 10.

Further, in this example, computing device 24 is configured to adjust one or more build parameters in real-time based on electrical signals 44 received from first optical detector 38. For example, as system 10 builds part 28, computing device 24 processes electrical signals 44 from first optical detector 38 using data processing algorithms to determine the size and temperature of melt pool 22. Computing device 24 compares the size and temperature of melt pool 22 to an expected or desired melt pool size and temperature based on a calibration model. Computing device 24 generates control signals 60 that are fed back to controller 26 and used to adjust one or more build parameters in real-time to correct discrepancies in melt pool 22. For example, where computing device 24 detects discrepancies in melt pool 22, computing device 24 and/or controller 26 adjusts the power of laser device 14 during the build process to correct such discrepancies.

Controller 26 includes any suitable type of controller that enables system 10 to function as described herein. In one embodiment, for example, controller 26 is a computer system that includes at least one processor and at least one memory device that executes executable instructions to control the operation of system 10 based at least partially on instructions from human operators. Controller 26 includes, for example, a 3D model of part 28 to be fabricated by system 10. Executable instructions executed by controller 26 includes controlling the power output of laser device 14, controlling a position and scan speed of first scanning device 18, and controlling a position and scan speed of second scanning device 42.

Controller 26 is configured to control one or more components of system 10 based on build parameters associated with a build file stored, for example, within computing device 24. In the exemplary embodiment, controller 26 is configured to control first scanning device 18 based on a build file associated with a component to be fabricated with system 10. More specifically, controller 26 is configured to control the position, movement, and scan speed of mirror 34 using motor 36 based upon a predetermined path defined by a build file associated with part 28.

In the exemplary embodiment, controller 26 is also configured to control second scanning device 42 to direct EM radiation 40 from melt pool 22 to first optical detector 38. Controller 26 is configured to control the position, movement, and scan speed of first mirror 46 and second mirror 50 based on at least one of the position of mirror 34 of first scanning device 18 and the position of melt pool 22. In one embodiment, for example, the position of mirror 34 at a given time during the build process is determined, using computing device 24 and/or controller 26, based upon a predetermined path of a build file used to control the position of mirror 34. Controller 26 controls the position, movement, and scan speed of first mirror 46 and second mirror 50 based upon the determined position of mirror 34. In another embodiment, first scanning device 18 is configured to communicate the position of mirror 34 to controller 26 and/or computing device 24, for example, by outputting position signals to controller 26 and/or computing device 24 that correspond to the position of mirror 34. In yet another embodiment, controller 26 controls the position, movement, and scan speed of first mirror 46 and second mirror 50 based on the position of melt pool 22. The location of melt pool 22 at a given time during the build process is determined, for example, based upon the position of mirror 34.

Controller 26 is also configured to control other components of system 10, including, without limitation, laser device 14. In one embodiment, for example, controller 26 controls the power output of laser device 14 based on build parameters associated with a build file.

Figure 2:
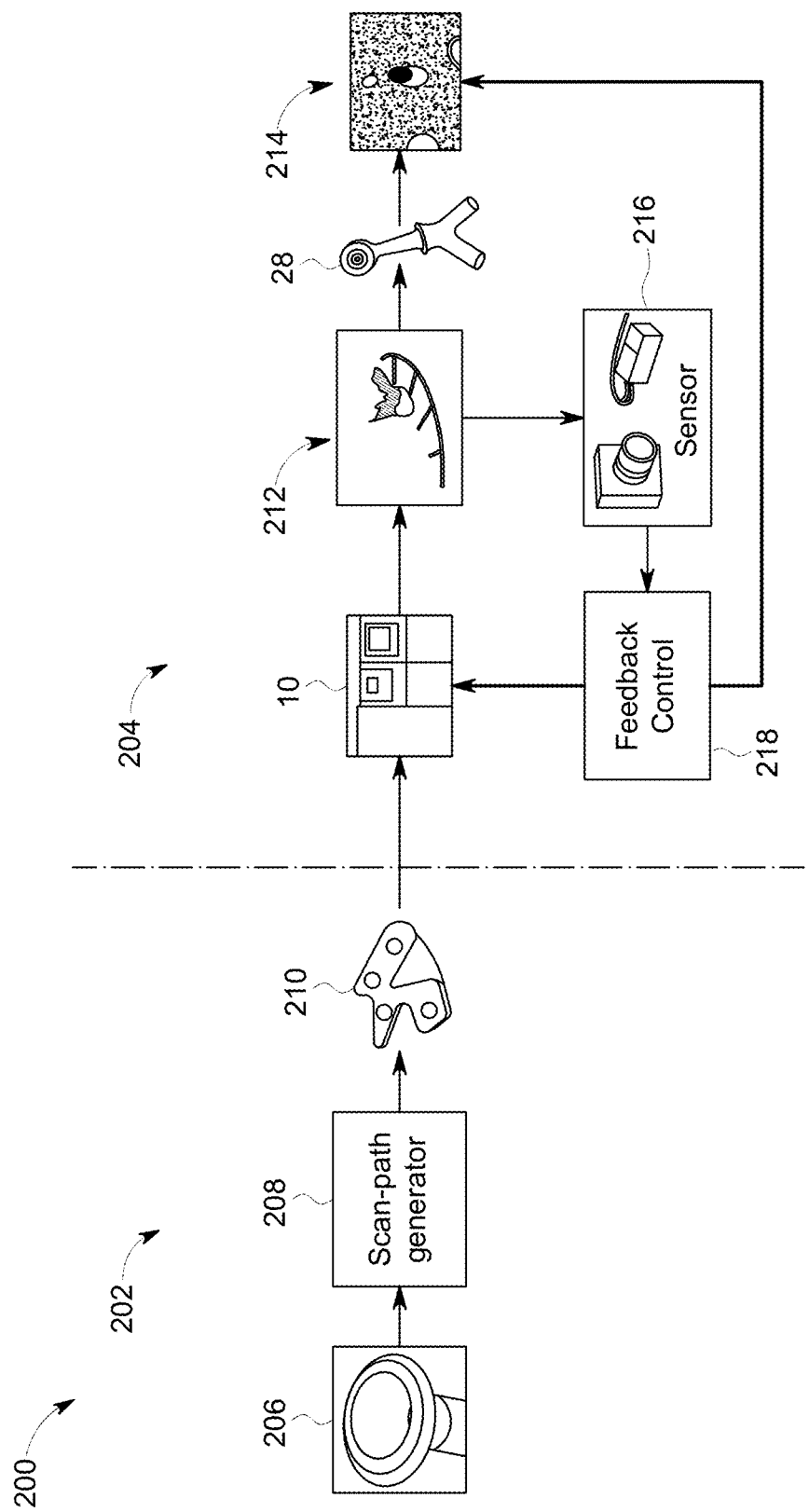
FIG. 2 is a flow chart of an exemplary process of manufacturing a component using the additive manufacturing system shown in FIG. 1.

FIG. 2 is a flow chart of an exemplary process 200 of manufacturing a part 28 using additive manufacturing system 10, shown in FIG. 1. In the exemplary embodiment, process 200 is divided into two sections, a set-up process 202 and a manufacturing process 204.

In set-up process 202, a computer-aided design (CAD) file 206 includes a design of part 28 to be manufactured. In the exemplary embodiment, CAD file 206 is provided to a computer device, such as preprocessing computer device 304, shown in FIG. 3. Preprocessing computer device 304 includes a scan-path generator 208. Scan-path generator 208 is configured to analyze CAD file and determine how to manufacture part 28 using additive manufacturing system 10. In the exemplary embodiment, scan-path generator 208 determines the layers of material that comprise part 28 and determines the path that controller 26 will instruct the laser beam 16 to follow. Scan-path generator 208 also determines the order of operations and movements that additive manufacturing system 10 will perform during manufacturing process. Scan-path generator 208 generates a build file 210 based on CAD file 206. In the exemplary embodiment, build file 210 is configured for the type and/or model of additive manufacturing system 10 that will be used. In some further embodiments, build file 210 is configured for the specific machine that will be building part 28. In the exemplary embodiment, scan-path generator 208 slices the 3D image of the component into slices or layers. Scan-path generator 208 generates the paths of the one or more laser devices 14 (shown in FIG. 1) for each slice or layer. Scan-path generator 208 calculates the one or more parameters for each point along the generated paths.

Build file 210 includes build parameters that are used to control one or more components of system 10. Build parameters include, without limitation, a power of laser device 14, a scan speed of first scanning device 18, a position and orientation of first scanning device 18 (specifically, mirror 34), a scan speed of second scanning device 42, a position and orientation of second scanning device 42 (specifically, first mirror 46 and second mirror 50) (all shown in FIG. 1), a desired melt pool size, and a desired melt pool temperature profile.

In manufacturing process 204, build file 210 is loaded into computing device 24 and/or controller 26 (shown in FIG. 1), which controls the operation of system 10. System 10 uses build file 210 to build 212 part 28. As system 10 is building, one or more sensors 216, such as optical system 20 (shown in FIG. 1), monitor part 28 for a feedback control 218 of part 28. As described above, sensors 216 monitor the building 212 of part 28 in real-time and transmit the results to computing device 24. Computing device 24 uses the feedback control information to determine whether or not to change any current parameters to correct for potential issues. As described above, computing device 24 transmits any changes to the parameters to controller 26. In some embodiments, computing device 24 uses the feedback control information to determine that the building 212 should be stopped due to issues discovered through analysis of the feedback control data. In some further embodiment, computing device 24 uses the feedback control information to determine whether or not to inspect 214 part 28. For example, computing device 24 may determine that too many errors occurred during the manufacture 212 of part 28 and that the cost of inspection 214 should be bypassed and part discarded.

Manufacturing process 204 also includes a post-build inspection 214, where finished part 28 is analyzed for quality purposes. This inspection 214 may include data from sensors 216, a computerized tomography (CT) scan, a computerized axial tomography (CAT) scan, ultrasonic imaging scan, a visual inspection, and/or any other non-destructive scan or analysis of part 28 to determine the quality and suitable of part 28 for use. In other embodiments, inspection 214 may include destructive testing, where a section of part 28 is removed, polished, and analyzed for porosity and other metallurgical properties.

In the exemplary embodiment, build file 210 includes a plurality of geometries. In some embodiments, the geometries are defined by build file 210. In other embodiments, the geometries are defined by the user. In the exemplary embodiment, different geometries have different thermal conduction characteristics and require different levels of laser power to complete based on their surroundings. In some geometries, the previous layer is solid metal that has already been lasered. In these geometries, when the powder is lasered the heat is conducted away rapidly by the solid metal. Therefore, the size and the temperature of melt pool 22 are affected as the heat is conducted away. In some other geometries, there is powder below the point being lasered, such as in the case of an arch. In these places, the heat is not conducted away as quickly, therefore it takes less laser power to bring melt pool 22 to the same size and temperature than the areas where the heat is conducted away. The amount of solid metal and the shape of the solid metal beneath the point being lasered also may affect the thermal conductivity of part 28.

In the exemplary embodiment, build file 210 includes the melt pool size as a build parameter. Computer device 24 adjusts the laser power and speed to achieve the desired melt pool size. In the exemplary embodiment, computer device 24 receives sensor information including the melt pool size and adjusts the laser settings to achieve the desired melt pool size.

Figure 3:
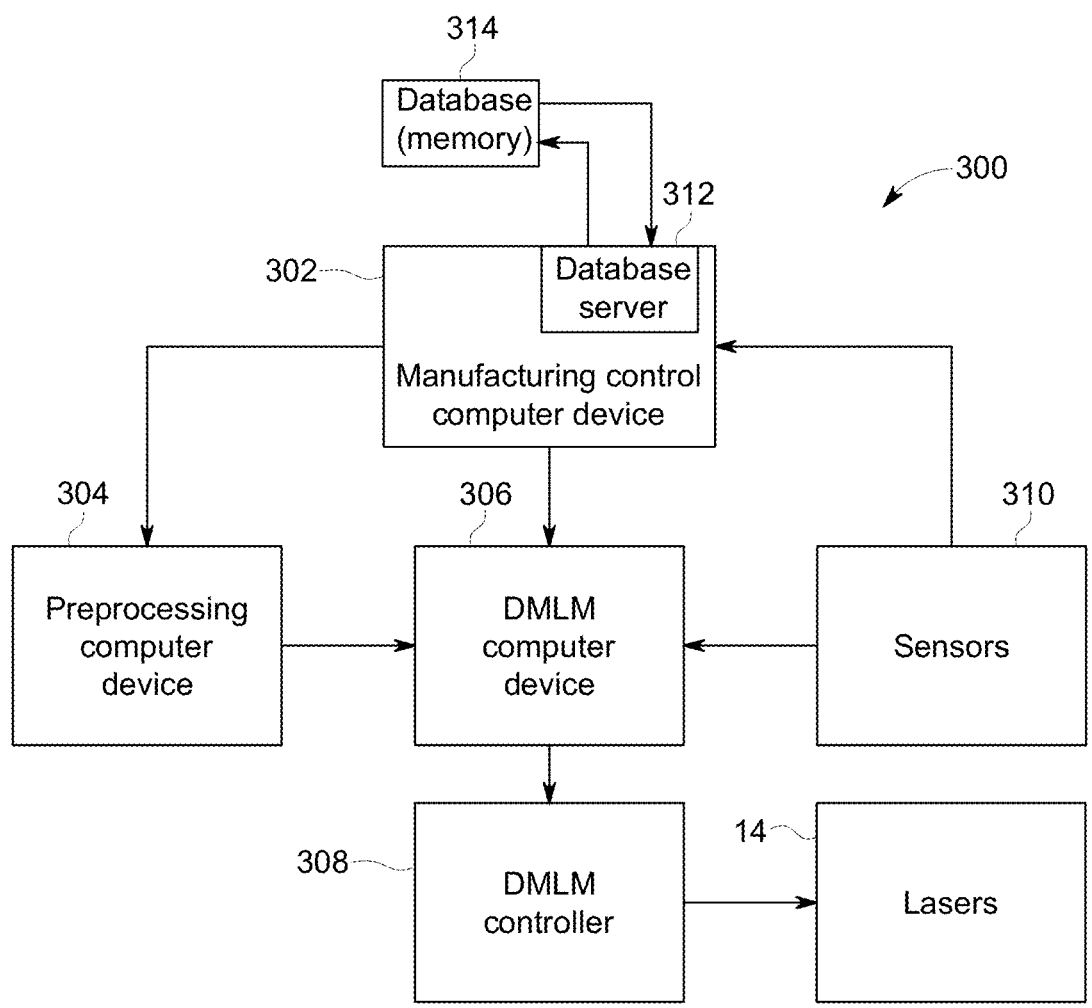
FIG. 3 is a schematic view of an exemplary manufacturing system to dynamically adapt additive manufacturing of a part using the DMLM system shown in FIG. 1.

FIG. 3 is a schematic view of an exemplary manufacturing system 300 to dynamically adapt additive manufacturing of a part using DMLM system 10, shown in FIG. 1. In the exemplary embodiment, manufacturing system 300 is used for building a part 28 (shown in FIG. 1), monitoring the building of a part 28, and updating build file 210 (shown in FIG. 2) associated with part 28 based on the build. Manufacturing system 300 includes a manufacturing control ("MC") computing device 302 configured to dynamically update the build file 210 of a part 28. Manufacturing system 300 includes a DMLM computer device 306 configured to dynamically update the build file 210 of a part 28 during the manufacture of part 28.

As described below in more detail, MC computing device 302 is configured to store a model of a part 28 including a plurality of build parameters, receive current sensor information of at least one current sensor reading of a melt pool 22 (shown in FIG. 1) from a build of part 28 in progress, determine one or more attributes of melt pool 22 based on the current sensor information, calculate at least one unseen attribute of the melt pool 22, determine an adjusted build parameter based on the at least one unseen attribute, the one or more attributes, and the plurality of build parameters, and transmit the adjusted build parameter to a machine, such as system 10, currently manufacturing the part.

In some embodiments, MC computer device 302 is further configured to store build file 210 for building part 28 including a plurality of geometries that each include one or more values of a first build parameter, receive sensor information of a build of part 28 by system 10 using build file 210, compare the sensor information for each geometry of the plurality of geometries to the corresponding one or more values of the first build parameter to determine one or more differences, determine one or more values for a second build parameter for each of the geometries based on the one or more differences, generate an updated build file 210 for part 28 including the one or more values for the second build parameter, and transmit the updated build file 210 to system 10.

In some further embodiments, MC computer device 302 is further configured to store build file 210 for building part 28 including a plurality of geometries that each include one or more build parameters, receive sensor information of a first geometry being built from a build of part 28 in progress, determine one or more adjustments to the one or more build parameters for the first geometry based on the sensor information, identify one or more subsequent geometries of the plurality of geometries to be built that are similar to the first geometry, adjust, in build file 210, one or more build parameters of the one or more subsequent geometries based on the one or more adjustments, and transmit the adjusted build file 210 to system 10 currently manufacturing part 28.

In still further embodiments, MC computer device 302 is configured store build file 210 for building part 28 including one or more build parameters and receive a plurality of build information. Each build information of the plurality of build information includes sensor information of a build of part 28 by one of a plurality of machines 10 using build file 210. MC computer device 302 is further configured to compare the plurality of sensor information to the one or more build parameters to determine one or more differences, determine one or more adjustments to the one or more build parameters based on the one or more differences, generate an updated build file 210 based on the one or more adjustments, and transmit the updated build file 210 to at least one system 10 of the plurality of systems 10 for manufacture.

In the exemplary embodiment, a preprocessing computer device 304 is a computer or computer device configured to generate build files 210 based on CAD files 206 (shown in FIG. 2). In the exemplary embodiment, preprocessing computer device 304 includes scan-path generator 208. In the exemplary embodiment, preprocessing computer device 304 is in communication with MC computer device 302 and DMLM computer device 306. In some embodiments, preprocessing computer device 304 is in communication with a user computer device (not shown). In some embodiments, preprocessing computer device 304 is communicatively coupled to other computer devices through various wired and wireless interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Preprocessing computer device 304 can be any device capable of performing the steps described herein including, but not limited to, a desktop computer, a laptop computer, a personal digital assistant (PDA), a cellular phone, a smartphone, a tablet, or other network connectable equipment.

In the exemplary embodiment, MC computer device 302 is also in communication with DMLM computer device 306, which is similar to computer device 24 (shown in FIG. 1). In the exemplary embodiment, DMLM computer device 306 is configured to communicate with and control DMLM controller 308, which controls the one or more laser devices 14 (shown in FIG. 1) during the build of part 28. In the exemplary embodiment, DMLM controller 308 is similar to controller 26 (shown in FIG. 1). As described above, DMLM computer device 306 and DMLM controller 308 control the build of part 28 based on build file 210. In the exemplary embodiment, DMLM computer device 306 receives sensor data from sensors 310 during and after the build of part 28. DMLM computer device 306 is configured to communicate with MC computer device 302 through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. DMLM computer device 306 can be any device capable of accessing a network, such as the Internet, including, but not limited to, a desktop computer, a laptop computer, a personal digital assistant (PDA), a cellular phone, a smartphone, a tablet, a phablet, embedded in a device such as system 10, or other network connectable equipment.

Sensors 310 are adapted to measure a parameter of interest, such as temperature, distributed temperature, pressure, electric current, magnetic field, electric field, chemical properties, dimensions, size, shape, or a combination thereof Some sensors 310 may include optical system 20 (shown in FIG. 1), and may further include, for example and without limitation, a photomultiplier tube, a photodiode, an infrared camera, a charged-couple device (CCD) camera, a CMOS camera, a pyrometer, or a high-speed visible-light camera. In other embodiments, sensors 310 may be similar to sensors 216 (shown in FIG. 1), and include devices capable of performing a computerized tomography (CT) scan, a computerized axial tomography (CAT) scan, ultrasonic imaging scan, a visual inspection, and/or any other non-destructive scan or analysis of part 28 to determine the quality and suitable of part 28 for use. Sensors 310 connect to MC computer device 302 or DMLM computer device 306 through many interfaces including without limitation a network, such as a local area network (LAN) or a wide area network (WAN), dial-in-connections, cable modems, Internet connection, wireless, and special high-speed Integrated Services Digital Network (ISDN) lines. Sensors 310 receive data about the build of a part 28 and report that data to at least MC computer device 302 or DMLM computer device 306. In some embodiments, sensors 310 are also in communication with other computer systems, such as, but not limited to, user computer devices.

A database server 312 is coupled to database 314, which contains information on a variety of matters, as described herein in greater detail. In one embodiment, centralized database 314 is stored on MC computer device 302. In an alternative embodiment, database 314 is stored remotely from MC computer device 302 and may be non-centralized. In some embodiments, database 314 includes a single database having separated sections or partitions or in other embodiments, database 314 includes multiple databases, each being separate from each other. Database 314 stores, without limitation, data and information such as build files 210, geometries, sensor data, and parameter adjustments. In some embodiments, a user is able to access database 314 by logging into MC computer device 302, such as through a user computer device.

Figure 4:
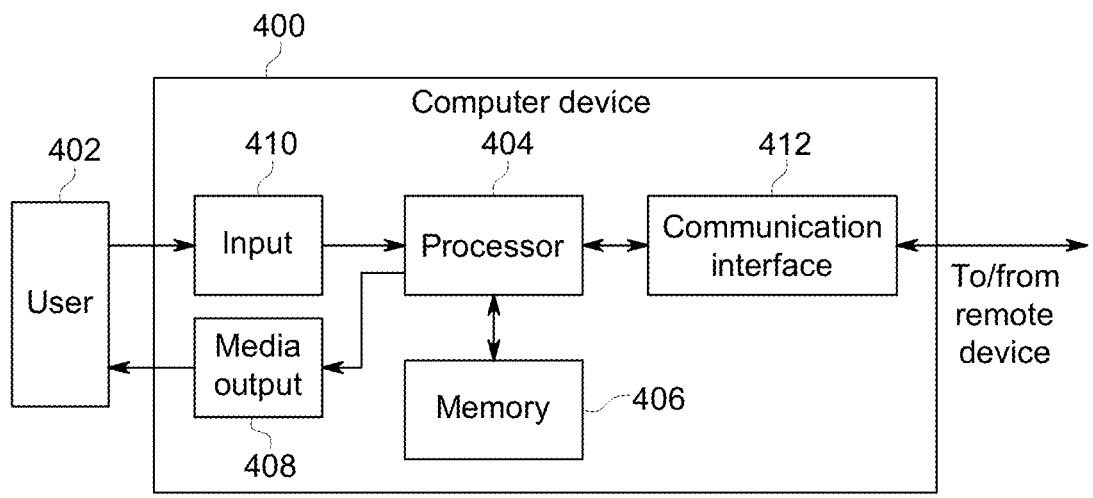
FIG. 4 is a schematic view of an exemplary configuration of a client system that may be used with the manufacturing system shown in FIG. 3.

FIG. 4 is a schematic view of an exemplary configuration of a client system that may be used with manufacturing system 300 (shown in FIG. 3). Computer device 400 is operated by a user 402. Computer device 400 may include, but is not limited to, DMLM controller 308, controller 26, DMLM computer device 306, computer device 24, and user computer device (not shown). Computer device 400 includes a processor 404 for executing instructions. In some embodiments, executable instructions are stored in a memory area 406 (also known as a memory device). Processor 404 may include one or more processing units (e.g., in a multi-core configuration). Memory area 406 is any device allowing information such as executable instructions and/or transaction data to be stored and retrieved. Memory area 406 includes one or more computer readable media. In some embodiments, memory area 406 includes database 314 (shown in FIG. 3). In some embodiments, memory area 406 is stored in computer device 400. In alternative embodiments, memory area 406 is stored remotely from computer device 400.

Computer device 400 also includes at least one media output component 408 for presenting information to user 402. Media output component 408 is any component capable of conveying information to user 402. In some embodiments, media output component 408 includes an output adapter (not shown) such as a video adapter and/or an audio adapter. An output adapter is operatively coupled to processor 404 and operatively coupled to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 408 is configured to present a graphical user interface (e.g., a web browser and/or a client application) to user 402. In some embodiments, computer device 400 includes an input device 410 for receiving input from user 402. User 402 may use input device 410 to, without limitation, select a build file 210 (shown in FIG. 2) to view. Input device 410 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 408 and input device 410.

Computer device 400 may also include a communication interface 412, communicatively coupled to a remote device such as sensor 310 (shown in FIG. 3). Communication interface 412 may include, for example, a wired or wireless network adapter and/or a wireless data transceiver for use with a mobile telecommunications network or a local area network.

Stored in memory area 406 are, for example, computer readable instructions for providing a user interface to user 402 via media output component 408 and, optionally, receiving and processing input from input device 410. A user interface may include, among other possibilities, a web browser and/or a client application. Web browsers enable users, such as user 402, to display and interact with media and other information typically embedded on a web page or a website. A client application allows user 402 to interact with, for example, MC computer device 302 (shown in FIG. 3). For example, instructions may be stored by a cloud service, and the output of the execution of the instructions sent to the media output component 408.

Processor 404 executes computer-executable instructions for implementing aspects of the disclosure. In some embodiments, processor 404 is transformed into a special purpose microprocessor by executing computer-executable instructions or by otherwise being programmed. For example, processor 404 is programmed with instructions discussed further below.

Figure 5:
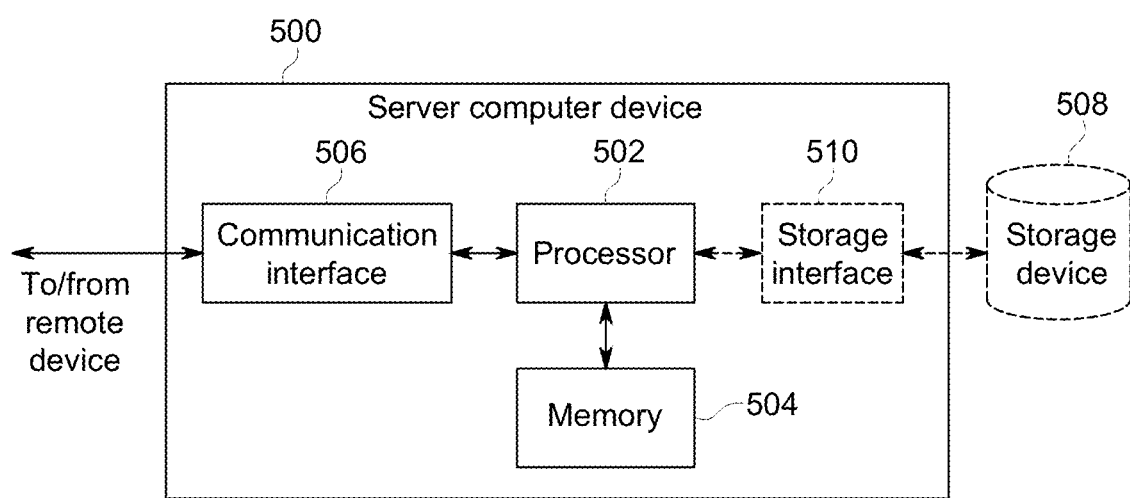
FIG. 5 is a schematic view of an exemplary configuration of a server system that may be used with the manufacturing system shown in FIG. 3.

FIG. 5 is a schematic view of an exemplary configuration of a server system that may be used with manufacturing system 300 (both shown in FIG. 3). More specifically, server computer device 500 may include, but is not limited to, MC computer device 302, preprocessing computer device 304, DMLM computer device 306, and database server 312 (both shown in FIG. 3). Server computer device 500 also includes a processor 502 for executing instructions. Instructions may be stored in a memory area 504 (also known as a memory device). Processor 502 may include one or more processing units (e.g., in a multi-core configuration).

Processor 502 is operatively coupled to a communication interface 506 such that server computer device 500 is capable of communicating with a remote device, such as another server computer device 500, sensors 310 (shown in FIG. 3), MC computer device 302, DMLM computer device 306, DMLM controller 308, (shown in FIG. 3), or user computer devices. For example, communication interface 506 may receive data from sensors 310, as illustrated in FIG. 3.

Processor 502 is also operatively coupled to a storage device 508. Storage device 508 is any computer-operated hardware suitable for storing and/or retrieving data, such as, but not limited to, data associated with database 314 (shown in FIG. 3). In some embodiments, storage device 508 is integrated in server computer device 500. For example, server computer device 500 may include one or more hard disk drives as storage device 508. In other embodiments, storage device 508 is external to server computer device 500 and is accessed by a plurality of server computer device 500. For example, storage device 508 may include a storage area network (SAN), a network attached storage (NAS) system, and/or multiple storage units such as hard disks and/or solid state disks in a redundant array of inexpensive disks (RAID) configuration.

In some embodiments, processor 502 is operatively coupled to storage device 508 via a storage interface 510. Storage interface 510 is any component capable of providing processor 502 with access to storage device 508. Storage interface 510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 502 with access to storage device 508.

Processor 502 executes computer-executable instructions for implementing aspects of the disclosure. In some embodiments, the processor 502 is transformed into a special purpose microprocessor by executing computer-executable instructions or by otherwise being programmed. For example, the processor 502 is programmed with instructions as described further below.

Figure 6:
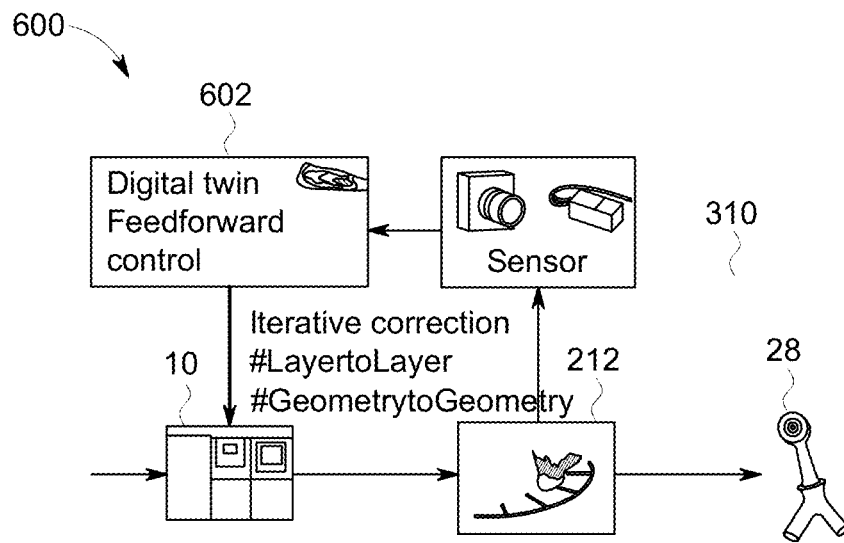
FIG. 6 is a schematic view of an exemplary feedforward control system to dynamically adapt additive manufacturing of a part using the manufacturing system shown in FIG. 3.

FIG. 6 is a schematic view of an exemplary feedforward control system 600 to dynamically adapt additive manufacturing of part 28 using manufacturing system 300 (shown in FIG. 3). In the exemplary embodiment, feedforward control system 600 is a part of manufacturing process 204 (shown in FIG. 2).

As described above, in system 10 builds 212 (shown in FIG. 2) part 28. While part 28 is being built 212, sensors 310 monitor part 28 and transmit real-time information about build process 212 to feedforward control computer device 602. In the exemplary embodiment, MC computer device 302 (shown in FIG. 3) includes feedforward control computer device 602.

Feedforward control computer device 602 receives the real-time sensor information from sensors 310. In the exemplary embodiment, feedforward control computer device 602 stores a copy of build file 210 (shown in FIG. 2). As described above, build file 210 includes a plurality of geometries, where the geometries are repeatable sections of part 28. In some embodiments, feedforward control computer device 602 analyzes build file 210 to determine the geometries contained therein. When feedforward control computer device 602 receives the real-time sensor information, feedforward control computer device 602 analyzes the sensor information in view of the geometry that system 10 is currently building 212. Once the geometry is complete, feedforward control computer device 602 determines updated build parameters for that particular geometry. Then feedforward control computer device 602 determines if there are other copies of that geometry or similar geometries in build file 210. Feedforward control computer device 602 applies those determined updated build parameters to any similar geometries in build file 210 that still need to be built. Feedforward control computer device 602 transmits the updated build parameters in build file 210 to system 10, so that system 10 may use those updated build parameters the next time that it has to build 212 that geometry in building part 28.

In some further embodiments, feedforward control computer device 602 also receives the adjusted build parameters from system 10, such as when system 10 has to increase power to keep the melt pool size constant through the use of feedback control 218 (shown in FIG. 2). Feedforward control computer device 602 uses the adjusted build parameters to further update the build parameters for other versions of the geometry.

In some embodiments, feedforward control computer device 602 generates a model (also known as a digital twin) of the process of manufacturing part 28 (e.g., melt pool response to the laser and sensor response to the melt pool). The model simulates the process of manufacturing part 28. In the exemplary embodiment, the model can be developed from physics, fitted to data, and/or a combination of both. In some embodiments, the model may include, without limitation, information from one or more of, build file 210, sensors 310 during building 212, and one or more inspections 214 after the build 212 is complete. The information provided or used may be based on data or intelligence that is real, artificial, or virtual. Real information comprises, but is not limited to, data or information that is measured or derived from physical parts or actual builds. Artificial information comprises, but is not limited to, data or information that is not measured or derived from physical parts or actual builds. Virtual information comprises, but is not limited to, data or information that is created, modeled, designed or otherwise derived using a computer. In some further embodiments, the model includes information from multiple builds of part 28. The model also includes the plurality of geometries described above. In some embodiments, the model can be adjusted and/or adapted using process measurements. The model may receive build parameter inputs (laser power, speed of scanning device, CAD geometry) and predict the response of the process (e.g., melt pool and sensor). In these embodiments, feedforward control computer device 602 may use the information in model to simulate a build 212 of part 28. Feedforward control computer device 602 is also able to further simulate the results from changes to the build parameters.

Figure 7:
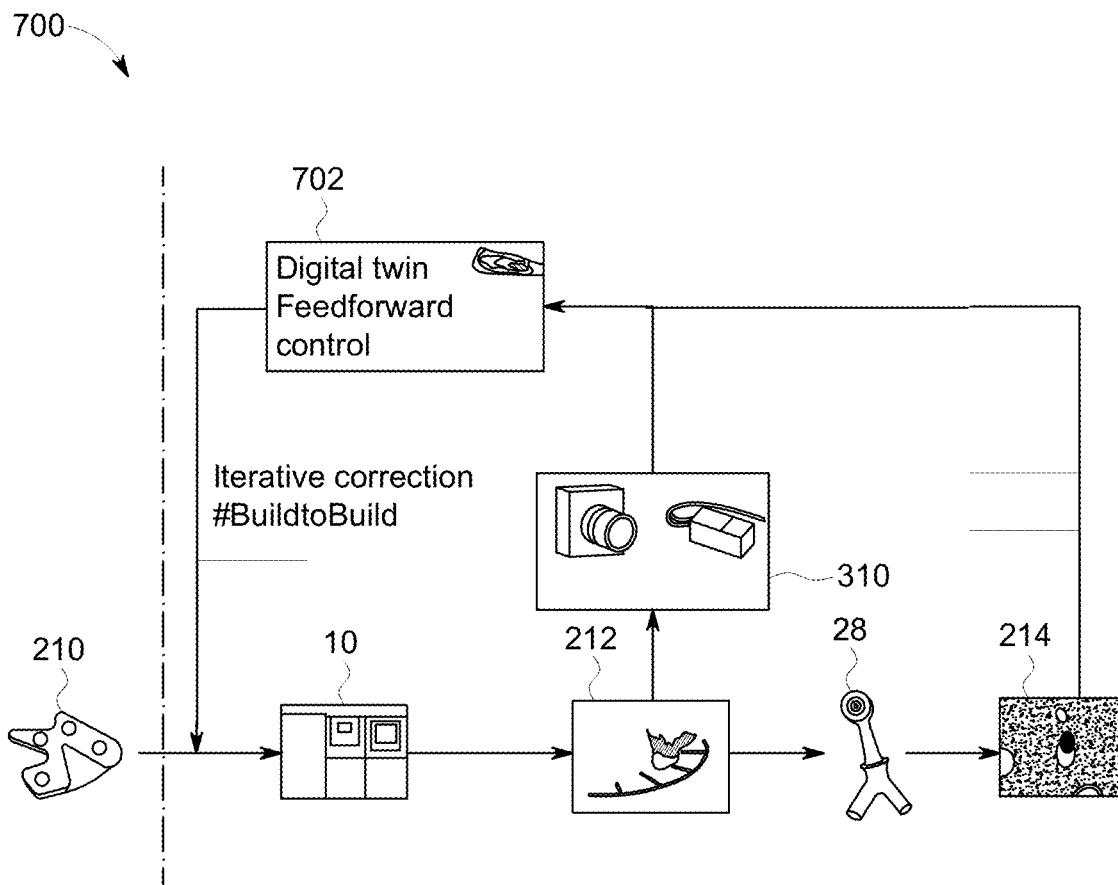
FIG. 7 is a schematic view of another exemplary feedforward control system to dynamically adapt additive manufacturing of a part using the manufacturing system shown in FIG. 3.

FIG. 7 is a schematic view of another exemplary feedforward control system 700 to dynamically adapt additive manufacturing of part 28 using manufacturing system 300 (shown in FIG. 3). In the exemplary embodiment, feedforward control system 700 is a part of manufacturing process 204 (shown in FIG. 2).

As described above, in system 10 builds 212 (shown in FIG. 2) part 28. While part 28 is being built 212, sensors 310 monitor part 28 and transmit real-time information about build process 212 to feedforward control computer device 702. In the exemplary embodiment, MC computer device 302 (shown in FIG. 3) includes feedforward control computer device 702. Feedforward control computer device 702 receives sensor information from sensors 310 about one or more already completed builds of part 28. In the exemplary embodiment, feedforward control computer device 702 stores a copy of build file 210 (shown in FIG. 2). As described above, build file 210 includes a plurality of geometries, where the geometries are repeatable sections of part 28. In some embodiments, feedforward control computer device 702 analyzes build file 210 to determine the geometries contained therein. Feedforward control computer device 702 also receives the adjusted build parameters from system 10, such as when system 10 had to increase power to keep the melt pool size constant.

When feedforward control computer device 702 receives the sensor information, feedforward control computer device 702 analyzes the sensor information in view of the geometry that the sensor information relates to. For each geometry, feedforward control computer device 702 compares the sensor information, the build parameters from build file 210, and the adjusted build parameters from system 10 to determine updated build parameters for that geometry. For example, feedforward control computer device 702 analyzes every instance of a particular geometry to see the build parameters and the results. Feedforward control computer device 702 determines updated build parameters for that geometry and applies those updated parameters to all similar geometries in build file 210.

In the exemplary embodiment, feedforward control computer device 702 applies the updated build parameters to build file 210 to generate an updated build file 210. In other embodiments, feedforward control computer device 702 generates a delta file to be a companion to build file 210, wherein the delta file includes the changes from build file 210. In some embodiments, build file 210 includes a first build parameter, such as melt pool size or melt pool temperature profile. The delta file includes a second build parameter, such as power and/or scan speed of first scanning device 18 (shown in FIG. 1). In these embodiments, system 10 uses the delta file in conjunction with build file 210 to build part 28.

In some embodiments, feedforward control computer device 702 generates a model (also known as a digital twin) of the process of manufacturing part 28 (e.g., melt pool response to the laser and sensor response to the melt pool). The model simulates the process of manufacturing part 28. In the exemplary embodiment, the model can be developed from physics, fitted to data, and/or a combination of both. In some embodiments, the model includes information from build file 210, from sensors 310 during building 212, and from one or more inspections 214 after the build 212 is complete. In some further embodiments, the model includes information from multiple builds of part 28. The model also includes the plurality of geometries described above. In some embodiments, the model can be adjusted and/or adapted using process measurements. The model typically receives build parameter inputs (laser power, speed of scanning device, CAD geometry) and predicts the response of the process (e.g., melt pool and sensor). In these embodiments, feedforward control computer device 602 may use the information in model to simulate a build 212 of part 28. Feedforward control computer device 602 is also able to further simulate the results from changes to the build parameters.

Figure 12:
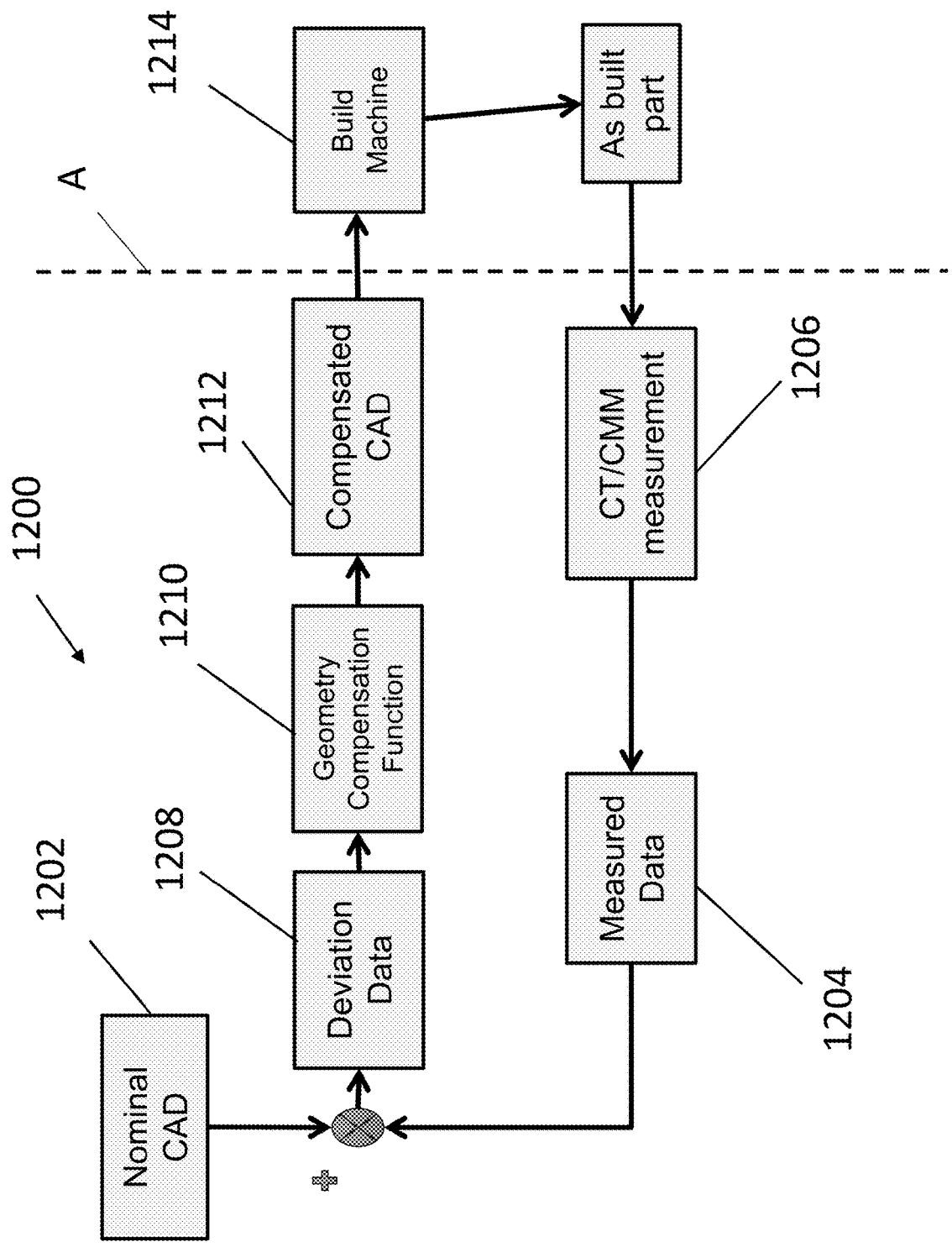
FIG. 12 is a schematic view of another exemplary process of dynamically creating or adapting a build parameter, build and/or build file for additively manufacturing one or more parts.
Figure 13:
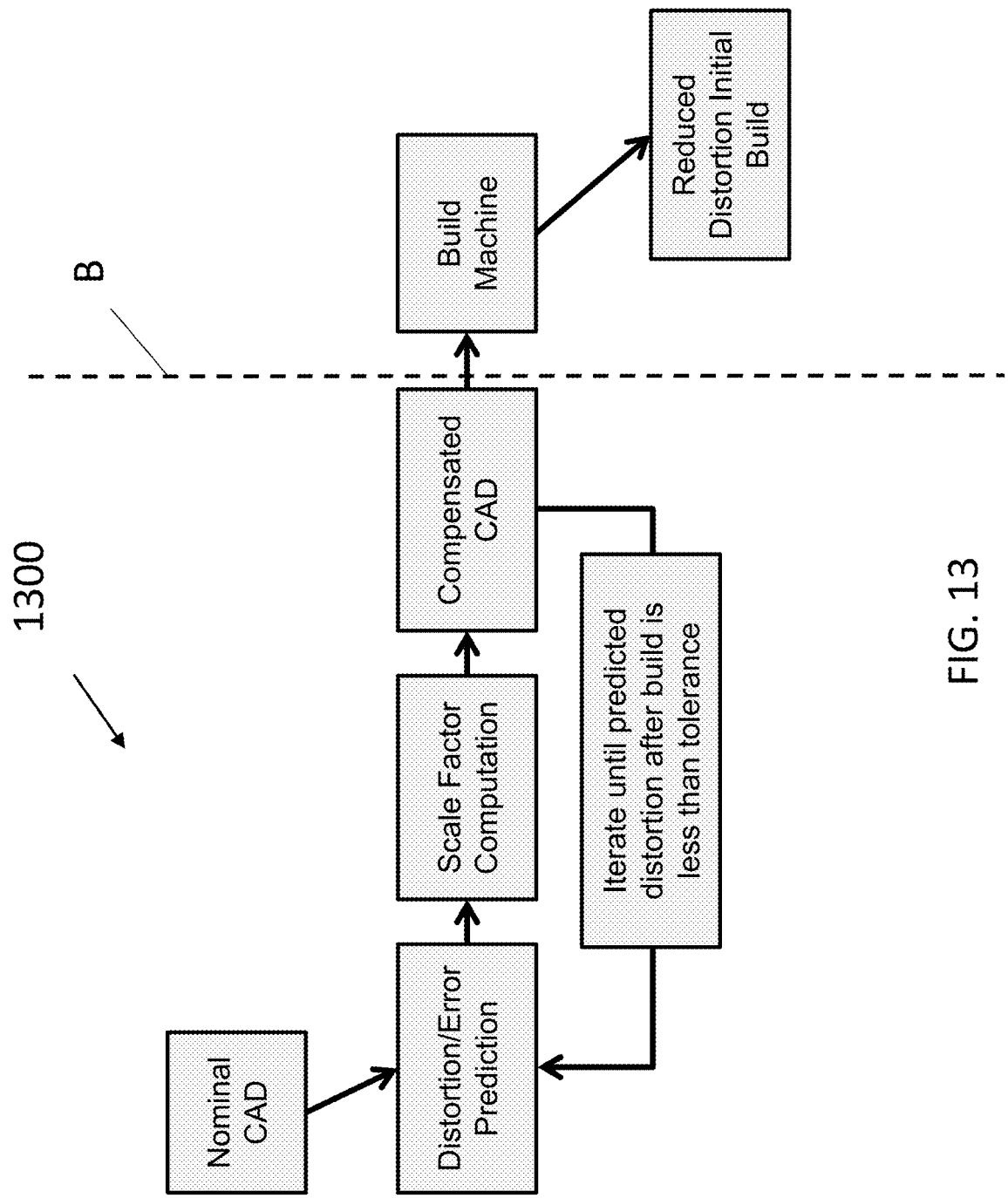
FIG. 13 is a schematic view of another exemplary process of dynamically creating or adapting a build parameter, build, and/or build file for additively manufacturing one or more parts.
Figure 14:
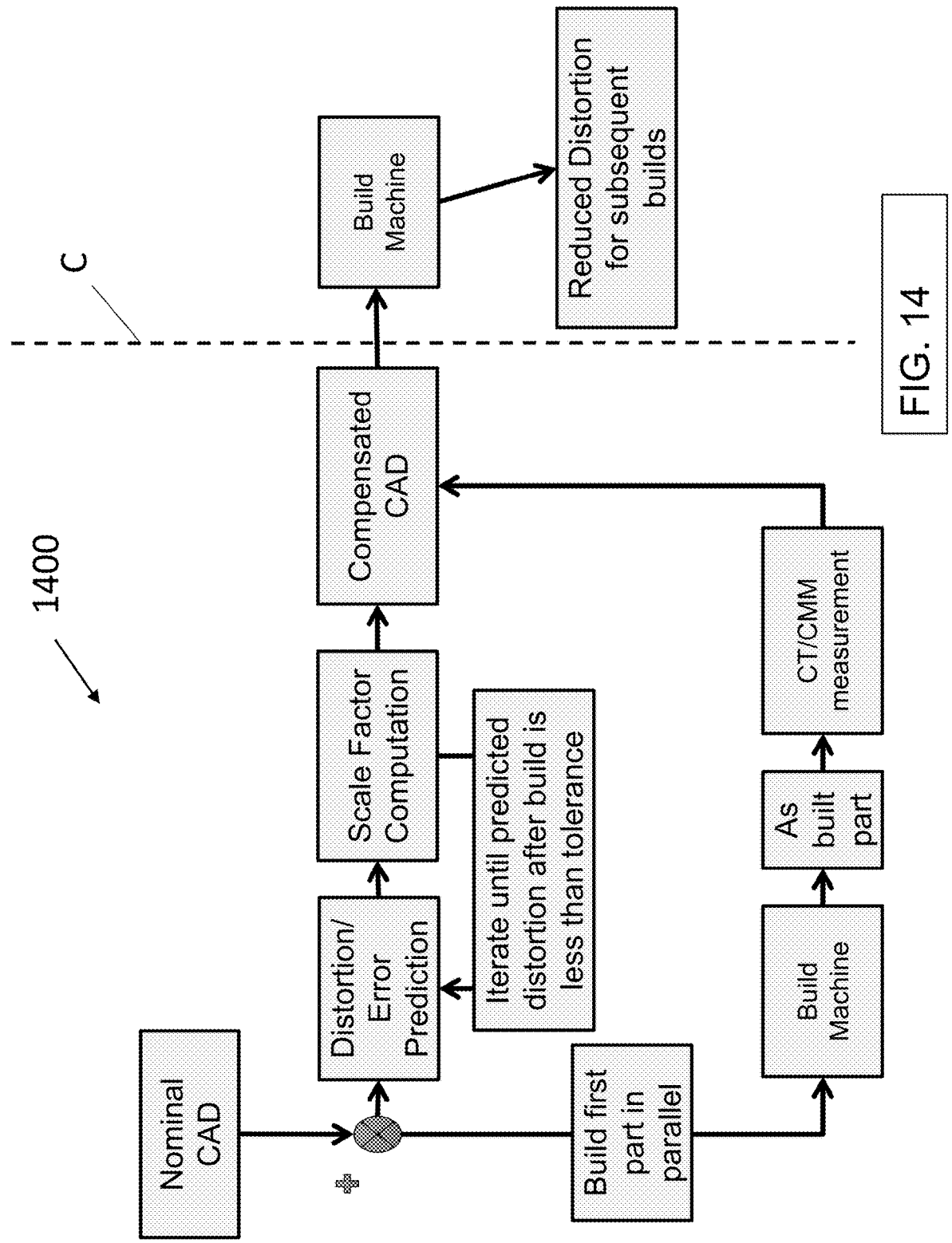
FIG. 14 is a schematic view of another exemplary process of dynamically creating or adapting a build parameter, build, and/or build file for additively manufacturing one or more parts.

FIGS. 12, 13 and 14 are schematic views of other exemplary systems and methods comprising devices that dynamically adapt a build, a build parameter, and/or a build file for additive manufacturing one or more parts. As an example, device 1200 may be used to carry out a method for adjusting the designed shape of additively built parts having a desired final shape. The method, in part, enables an additive manufacturing system to compensate or adjust, before, during or after a build, using for example DMLM system 1214, for geometry distortions or other changes that may occur during an additive manufacturing process. For example, a physical part may be fabricated using a build file that may be associated with a CAD or virtual model 1202, such as nominal CAD model. The characteristics and physical features of the desired physical or digital part may be measured or otherwise determined and stored electronically, before, during or after a build. The measurements or other determinations 1204 may be made digitally, physically, or virtually, using a variety of means 1206 including, but not limited to, inspection/meteorology, computer tomography, X-Rays, magnetic resonance, ultrasound, optical, electronic, radio frequency, photographic, and scanning. Without limitation, means 1206 may be an integral part of, or in communication with, device 1200 or may be a separate device. The measurements or other determinations of the characteristics and features of the physical or digital part may be compared to the nominal CAD model or known characteristics or features, before, during or after a build process, to identify differences or deviations, such as geometrical and material differences. The nominal CAD model or other digital or virtual model may then be modified/deformed, for example as CAD 1212, using, for example, a geometry compensation function 1210, as functionally guided by the geometrical or material differences 1208, so that the geometry or other characteristics or features may be compensated or otherwise modified before, during or after a build. In some embodiments a partial or entire build file is generated based on the modifications. In some embodiments, without limitation, portions or the entire build itself, and one or more build parameters, are modified directly or indirectly.

Device 1200 may be configured as a partial or whole digital twin or virtual build of a build process or AM machine. Devices 1200, 1300 and 1400 may be stand-alone devices separate from one more build machines, such as build machine 1214, as indicated by reference lines A, B and C. Devices 1200, 1300, and 1400 may communicate with build machines directly or indirectly, through a communication means such as but not limited to a computer-enabled means, hardwired or wirelessly, via a removable memory device, or the cloud.

The build parameters used by devices 1200, 1300, 1400 are those used to control one or more components of one or more systems or to otherwise build parts. The build parameters will depend on the additive manufacturing methods or systems employed and the materials making up the parts. Build parameters may comprise one or more of, without limitation, power, speed, orientation, position of energy sources, galvos, mirrors, scanners, sensors, detectors, conveyors, build plates, and material applicators and removers. Build parameters may also further comprise one or more of, without limitation, materials used by the system to carry out the methods such as gases, gas pressures, and flow of gases; melt pool size and melt pool temperature profile; materials making up the parts themselves and interim part materials; speed and method of applying the materials during the build; and the starting shape or shapes of the part, and interim-build shapes of the part. Build parameters may also further comprise one or more of, without limitation, geometries, material properties, process yields, and functional characteristics of the part and build.

Device 1200 may be configured as an integral part of, or in communication with, an additive manufacturing system, such as build machine 1214, that builds a part. For example, learned feedforward control, that is used as initial build parameters on a physical machine, may be configured to refine any feature or parameter by on-machine learning feedforward control or off-machine by a virtual build.

FIG. 13 is a schematic view of another exemplary system that dynamically adapts a build or build file for additive manufacturing a part. Device 1300 may be used, for example, as shown in the drawing, to modify a build file and re-compute the build prediction such that the geometric parameters relating to the local geometry's compliance or non-compliance may be determined. The device may comprise a build prediction tool. The tool may be finite element or rule based, and the predicted quantities such as, without limitation, distortion, or residual stress. Such quantities may be used to modify the build file and re-compute the build prediction. Compliance as used here refers generally to the geometric response, during a build, to a local geometric change. These geometric parameters may be used, for example, to calculate a local scale factor map that may be used in conjunction with measurement data to improve any final part distortion on subsequent builds. The system may iterate, for example, until the predicted distortion after a part is built is less than the tolerance threshold. The parameters may be based on real, virtual, or artificial data or information, or combinations thereof.

FIG. 14 is a schematic view of another exemplary system that writes, creates, modifies, or adapts a build or build file for additive manufacturing a part. Device 1400 may be used, for example, to dynamically modify a build file and re-compute the build prediction. The system may also comprise a build prediction tool, for example, that is finite element or rule based. The geometric parameters may be used, for example, to calculate a local scale factor map that may be used in conjunction with the predicted distortion to improve the initial part distortion. The scale factor map may then be used, for example, on subsequent or currently running builds in conjunction with measurement data to further refine the final part distortion on subsequent builds. The system for adapting a build or build file may use any type of data or information. The system may operate and/or iterate in parallel as one or more parts are being built, using pre-existing real, virtual or artificial data or information, real-time data or information, or a combination thereof. The system may also operate and/or iterate prior to or after a build, to adapt one or multiple, subsequent builds and/or one or multiple build machines. The build machines may be directly or wirelessly connected to device 1400, and may be located in close proximity to, or remote from, device 1400, and may communicate through the cloud.

Any one or more of the methods, features, or characteristics of devices 1200, 1300, or 1400 may be combined with any of the methods or systems disclosed herein. Any one or more of the methods and systems may comprise a virtual control loop, alone or in combination with a real-time control loop, either of which may use pre-existing, stored, predictive and/or real-time data or information. The information may be real, artificial or virtual.

Devices 1200, 1300, and 1400 may comprise a computer-enabled device for dynamically creating or modifying all or a portion of an additive manufacturing build, the build parameters, or a combination thereof, for making a part. The device may be in direct or indirect communication with an additive manufacturing machine or a plurality of machines that uses one or more build parameters. The device may be configured to analyze build information pertaining to the part or machine, wherein a portion of the build information pertains to pre-existing data about the part, and wherein a portion of the build information pertains to data that is non-pre-existing data about the part. Non-pre-existing data is data that is not associated with a part's current build prior to the assessment by the device.

Pre-existing and non-pre-existing data about the part may comprise, but is not limited to, build parameters, geometries, and data related to design, materials, post-processing, use, repair, tracking, material properties, process yield, functional characteristics, and cost, and combinations of these types of data. The data may be real, artificial or virtual, and may be derived from, or through, real, artificial, or virtual sources, or a combination of sources. The non-existing data may be data that is measured or sensed real-time during a build of one or more parts by one or more additive manufacturing machines.

The device may be configured to assess whether one or more differences between the pre-existing data and the non-pre-existing data will result in a deviation from or improvement to, the part. The deviation or improvement may comprise, but is not limited to, geometries, material properties, yield, functional characteristics, cost to build, tracking, and security. The assessment may include a virtual control loop that may be iterative. The device may also be configured to automatically create or modify one or more of the build parameters of the part based on the assessment of the one more differences.

Figure 8:
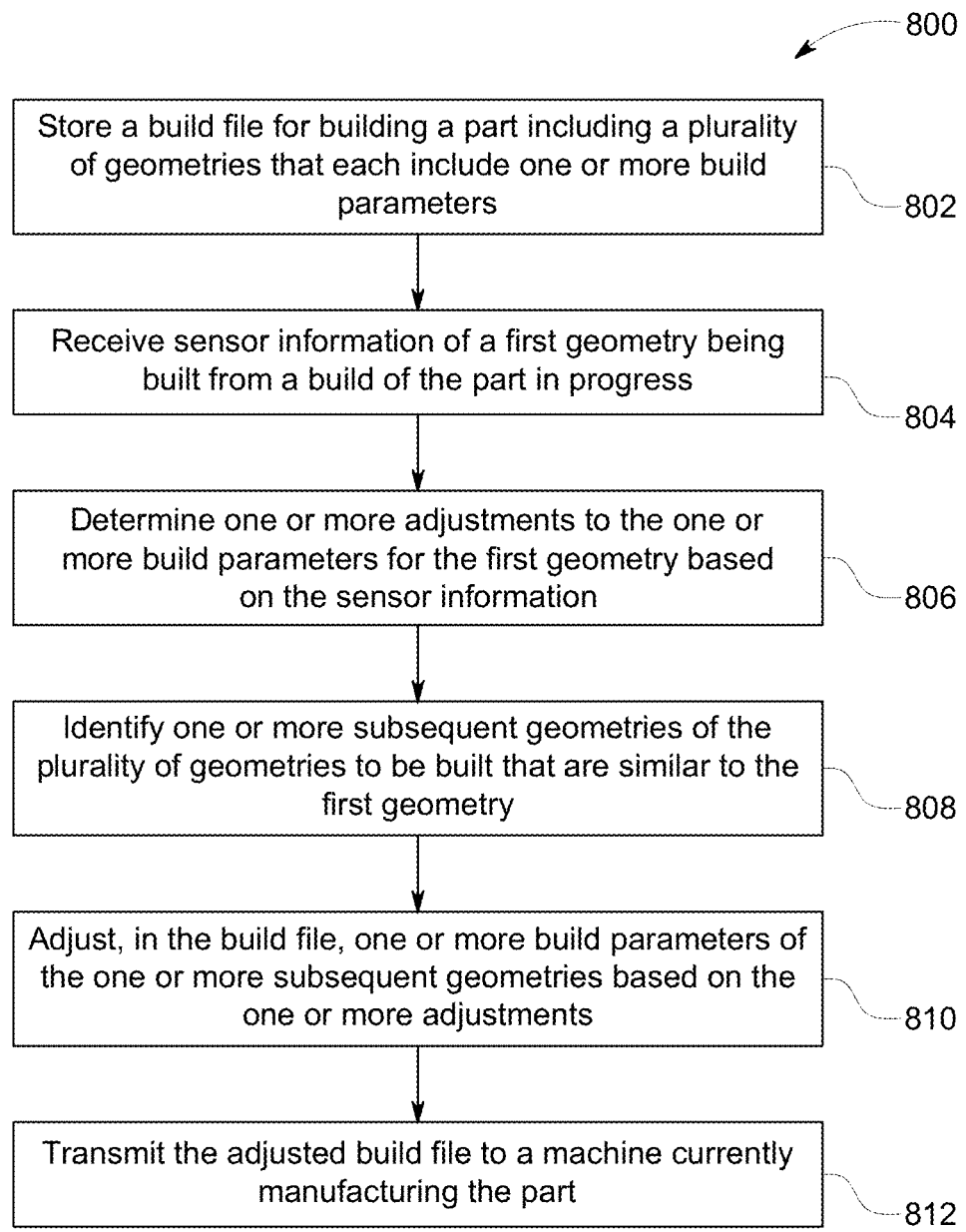
FIG. 8 is a flow chart of an exemplary process of dynamically adapting a build file for additive manufacturing of a part using the feedforward control system shown in FIG. 6.

FIG. 8 is a flow chart of an exemplary process 800 of dynamically adapting a build file 210 (shown in FIG. 2) for additive manufacturing of a part 28 (shown in FIG. 1) using feedforward control system 600 (shown in FIG. 6). In the exemplary embodiment, process 800 is performed by feedforward control computer device 602 (shown in FIG. 6). In other embodiments, process 800 is performed by MC computer device 302 (shown in FIG. 3).

In the exemplary embodiment, feedforward control computer device 602 stores 802 a build file 210 for building part 28 including a plurality of geometries that each include one or more build parameters. Examples of build parameters include, but are not limited to, a power of laser device 14 (shown in FIG. 1), scan speed of first scanning device 18, a desired melt pool size, and a desired melt pool temperature profile. In the exemplary embodiment, part 28 is actively being built 212 (shown in FIG. 2) by system 10 (shown in FIG. 1) using build file 210. Feedforward control computer device 602 receives 804 sensor information from one or more sensors 310 (shown in FIG. 3) of a first geometry of part 28 currently being built 212.

In the exemplary embodiment, feedforward control computer device 602 determines 806 one or more adjustments to the one or more build parameters for the first geometry based on the sensor information. As described above, feedforward control computer device 602 determines 806 the one or more adjustments to power and/or scan speed of first scanning device 18 to improve the building of that specific geometry. Feedforward control computer device 602 identifies 808 one or more subsequent geometries of the plurality of geometries to be built that are similar to the first geometry. Feedforward control computer device 602 adjusts 810 build file 210 with the one or more build parameters of the one or more subsequent geometries based on the one or more adjustments. Feedforward control computer device 602 transmits 812 the adjusted build file 210 to the system 10 that is currently manufacturing part 28.

In some embodiments, feedforward control computer device 602 receives subsequent sensor information of a subsequent copy of a similar geometry being built using the adjusted build file 210. Feedforward control computer device 602 further adjusts the one or more build parameters of the one or more remaining subsequent similar geometries based on the subsequent sensor information. For example, system 10 builds 212 a first copy of a geometry in part 28. Feedforward control computer device 602 determines a first set of adjustments to the build parameters for that specific geometry. After system 10 uses the first set of adjustments to the build parameters to build that a second copy of that geometry, feedforward control computer device 602 analyzes the results and further adjusts the build parameters. Feedforward control computer device 602 transmits the further adjusted build file 210 to system 10 for the next time system 10 builds 212 another copy of that geometry.

In some embodiments, feedforward control computer device 602 compares the sensor information from the first geometry and the subsequent sensor information from the second time the geometry is being built 212. In some embodiments, this second time is during a build 212 of the same part 28. In other embodiments, the second time is on a subsequent build 212 of a different copy of part 28. Feedforward control computer device 602 compares the one or more build parameters of the first geometry and the one or more build parameters of the subsequent geometry. Feedforward control computer device 602 determines the one or more adjustments based on the two comparisons.

In some further embodiments, feedforward control computer device 602 receives one or more real-time adjustments to the parameters from system 10. The one or more real-time adjustments were made by system 10 while building 212 of the first geometry of the part 28 through the use of feedback control 218 (shown in FIG. 2). Feedforward control computer device 602 determines the one or more adjustments for the one or more build parameters of the first geometry based on the sensor information and the one or more real-time adjustments.

Figure 9:
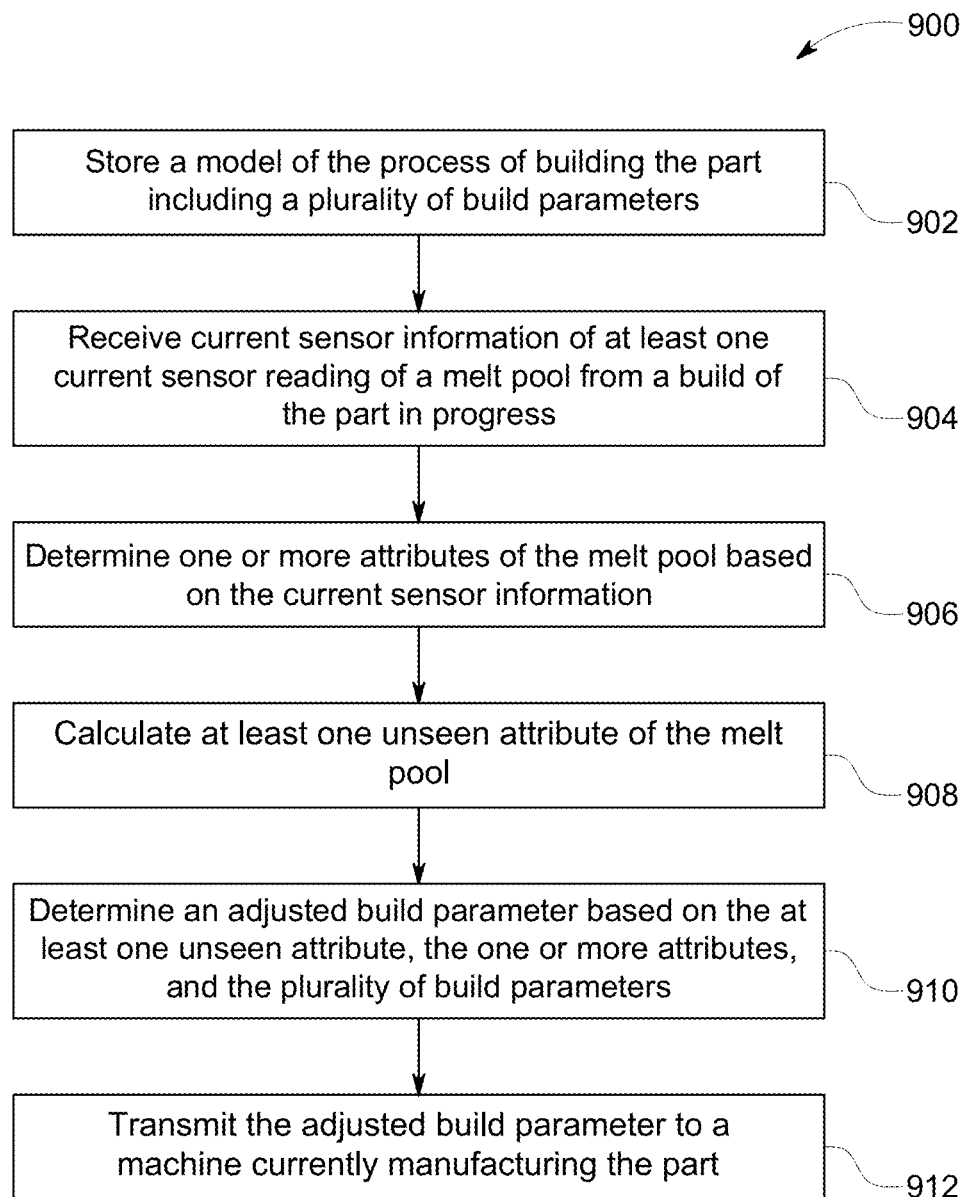
FIG. 9 is a flow chart of another exemplary process of dynamically adapting a build file additive manufacturing of a part using the feedforward control system shown in FIG. 6.

FIG. 9 is a flow chart of another exemplary process 900 of dynamically adapting a build file 210 (shown in FIG. 2) for additive manufacturing of a part 28 (shown in FIG. 1) using feedforward control system 600 (shown in FIG. 6). In the exemplary embodiment, process 900 is performed by feedforward control computer device 602 (shown in FIG. 6). In other embodiments, process 900 is performed by MC computer device 302 (shown in FIG. 3). In still further embodiments, process 900 is performed by feedforward control computer device 702 (shown in FIG. 7).

In the exemplary embodiment, feedforward control computer device 602 stores 902 a model of the manufacturing process for building part 28 including a plurality of build parameters. The build parameters may include, but are not limited to, a power of laser device 14 (shown in FIG. 1), a scan speed of first scanning device 18, a desired melt pool size, and a desired melt pool temperature profile. In the exemplary embodiment, the manufacturing process model is stored in database 314 (shown in FIG. 3). Feedforward control computer device 602 receives 904 current sensor information of at least one current sensor reading of a melt pool 22 (shown in FIG. 1) from a build 212 (shown in FIG. 2) of part 28 in progress.

In the exemplary embodiment, feedforward control computer device 602 determines 906 one or more attributes of melt pool 22 based on the current sensor information. The one or more attributes may include, but are not limited to, a melt pool width, a melt pool height, a melt pool temperature profile, a two dimensional (2D) melt pool shape, or any other directly observable attribute. Feedforward control computer device 602 calculates 908 at least one unseen attribute of melt pool 22. The unseen attribute represents an attribute of melt pool 22 that is not directly observable, such as, but not limited to, a melt pool depth and a three dimensional (3D) melt pool shape.

In the exemplary embodiment, feedforward control computer device 602 determines 910 an adjusted build parameter based on the at least one unseen attribute, the one or more attributes, and the plurality of build parameters. Feedforward control computer device 602 transmits 912 the adjusted build parameter to a machine, such as system 10, currently manufacturing part 28.

In the exemplary embodiment, the model effectively simulates the manufacturing process of building a digital twin of part 28 including information about the material, thermal characteristics, and other attributes of part 28. In some embodiments, the model also includes data from inspection 214 (shown in FIG. 2) of the completed part 28. In the exemplary embodiment, the model (digital twin) also includes the effects of all of the movements of the device to manufacture part 28. This includes the paths and power settings of the laser takes over time as the laser melts powder to manufacture 212 part 28. In the exemplary embodiment, DMLM computer device 306 or MC computing device 302 is able to simulate a build of part 28 using the model. Furthermore, as adjustments are made to the process to manufacture part 28, the adjustments are also made to the model.

In some further embodiments, the model includes the material, thermal characteristics, and other attributes of part 28 based on previous builds of similar parts. In these embodiments, preprocessing computer device 304 receives a build file 210 for a new part 28. Preprocessing computer device 304 analyzes build file 210 and generates a model of the manufacturing process of building part 28, where the manufacturing process model simulates the building of part 28 based on the received build file 210 and the information from the historical builds. Preprocessing computer device 304 uses the model to simulate a build of part 28. The historical information allows the models to be adapted to react as a physical process would during a build. For example, the model may determine the simulated melt pool size based on the laser settings and the historical information. Based on the historical information, preprocessing computer device 304 is able to determine where variations in power would be needed for building the part based on how other parts have been built in the past. In some further embodiments, preprocessing computer device 304 repeatedly simulates building part 28 based on the adjustments made during manufacturing with the results of one build being fed into the model for the next build.

In some embodiments, feedforward control computer device 602 generates the model. Feedforward control computer device 602 stores a build file 210 for building the part 28 including the plurality of build parameters. Feedforward control computer device 602 receives a plurality of build information. Each set of build information of the plurality of build information includes sensor information of a build of the part by a machine using build file 210. Feedforward control computer device 602 generates the model of the manufacturing process for part 28 based on build file 210 and the plurality of build information. In some further embodiments, feedforward control computer device 602 receives a plurality of sensor information from an additional build of part 28 and updates the manufacturing process model based on the received plurality of sensor information.

Figure 10:
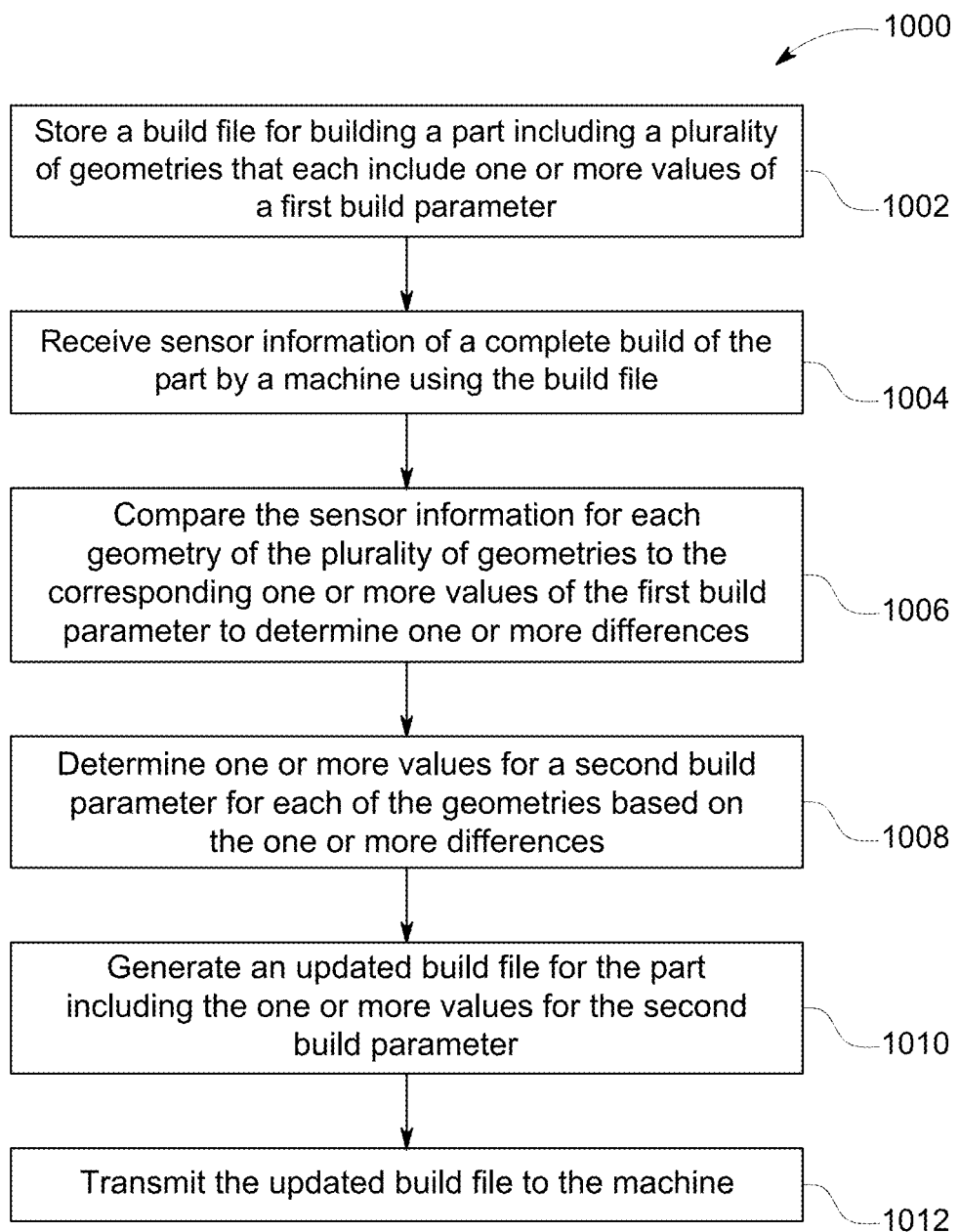
FIG. 10 is a flow chart of an exemplary process of dynamically adapting a build file for additive manufacturing of a part using the feedforward control system shown in FIG. 7.

FIG. 10 is a flow chart of an exemplary process 1000 of dynamically adapting a build file 210 (shown in FIG. 2) for additive manufacturing of a part 28 (shown in FIG. 1) using feedforward control system 700 (shown in FIG. 7). In the exemplary embodiment, process 1000 is performed by feedforward control computer device 702 (shown in FIG. 7). In other embodiments, process 1000 is performed by MC computer device 302 (shown in FIG. 3).

In the exemplary embodiment, feedforward control computer device 702 stores 1002 a build file 210 for building 212 (shown in FIG. 2) part 28 including a plurality of geometries that each include one or more values of a first build parameter. In the exemplary embodiment, the first build parameter includes at least one of a desired melt pool size and a desired melt pool temperature profile. Feedforward control computer device 702 receives 1004 sensor information of a build 212 of part 28 by system 10 (shown in FIG. 1) using build file 210. Feedforward control computer device 702 compares 1006 the sensor information for each geometry of the plurality of geometries to the corresponding one or more values of the first build parameter for those geometries to determine one or more differences.

Based on the one or more differences, feedforward control computer device 702 determines 1008 one or more values for a second build parameter for each of the geometries. Examples of the second build parameter include, but are not limited to, a power of laser device 14 (shown in FIG. 1) and a scan speed of first scanning device 18. Feedforward control computer device 702 generates 1010 an updated build file 210 for part 28 including the one or more values for the second build parameter. Feedforward control computer device 702 transmits 1012 the updated build file 210 to a system 10 for manufacture.

In some embodiments, feedforward control computer device 702 receives subsequent sensor information from a subsequent build of part 28 by system 10 using the updated build file 210. Feedforward control computer device 702 compares the subsequent sensor information for each geometry of the plurality of geometries to the corresponding one or more values of the second build parameter to determine one or more additional differences. Feedforward control computer device 702 determines one or more updated values for a second build parameter for each of the geometries based on the one or more additional differences. Feedforward control computer device 702 generates a further updated build file for the part including the one or more updated values for the second build parameter. Feedforward control computer device 702 transmits the further updated build file to system 10.

In some embodiments, feedforward control computer device 702 receives one or more real-time adjustments to the parameters from a system 10. The one or more real-time adjustments were made by the system 10 during build 212 of part 28 through the use of feedback control 218 (shown in FIG. 2). Feedforward control computer device 702 determines the one or more updated values for the second build parameter for each of the geometries based on the one or more differences and the one or more real-time adjustments.

In some further embodiments, feedforward control computer device 702 compares the plurality of geometries in build file 210 to determine at least one subset of geometries that are similar. Feedforward control computer device 702 determines the one or more updated values for the second build parameter for one of the subset of geometries. Feedforward control computer device 702 applies the determined one or more updated values to each occurrence of the subset of geometries in the updated build file 210.

In some embodiments, the first build parameter is stored in build file 210 and the second build parameter is stored in a delta file. Where both build file 210 and delta file are transmitted to system 10 to manufacture part 28.

Figure 11:
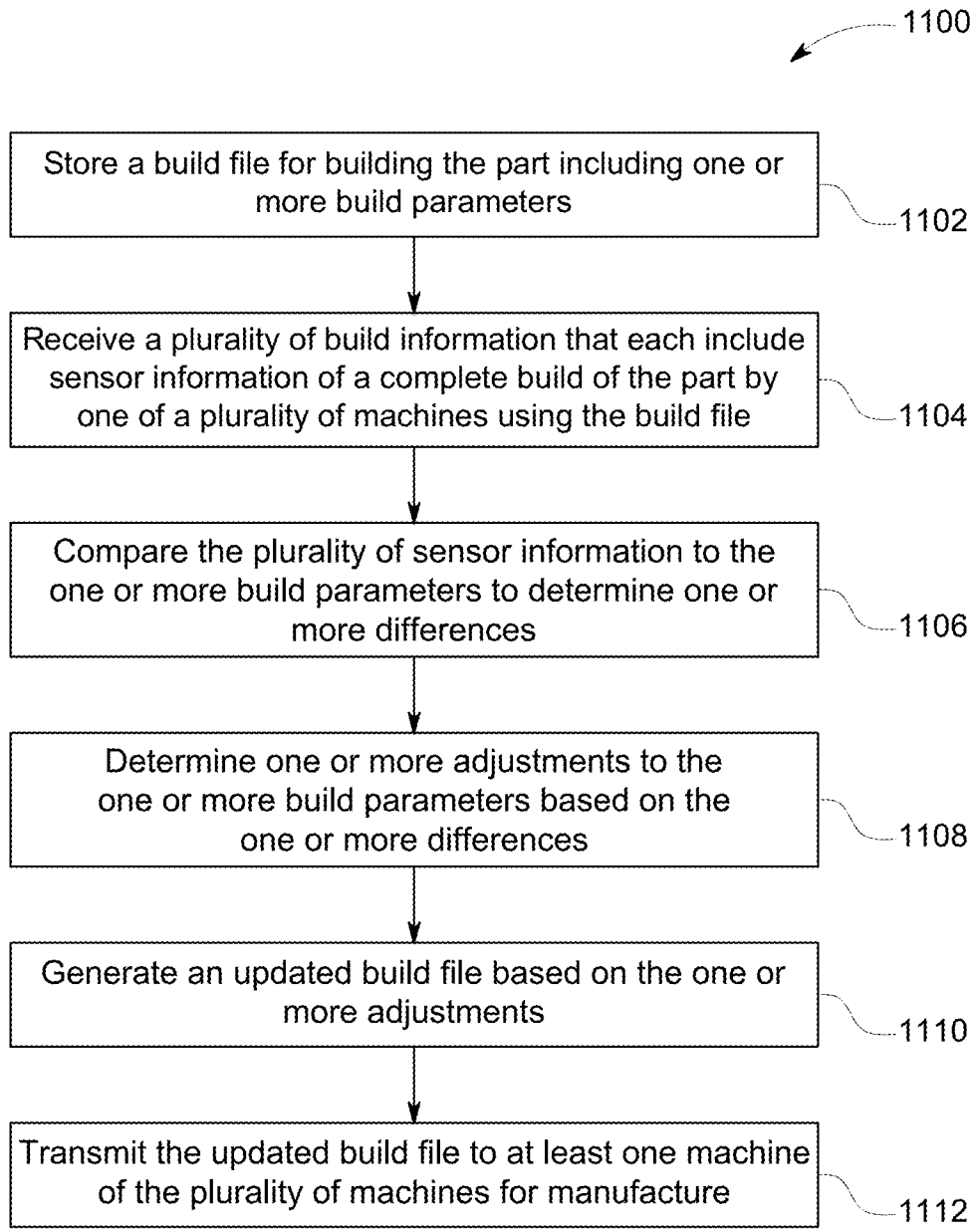
FIG. 11 is a flow chart of another exemplary process of dynamically adapting a build file for additive manufacturing of a part using the feedforward control system shown in FIG. 7.

FIG. 11 is a flow chart of another exemplary process of dynamically adapting a build file 210 (shown in FIG. 2) for additive manufacturing of a part 28 (shown in FIG. 1) using feedforward control system 700 (shown in FIG. 7). In the exemplary embodiment, process 1100 is performed by feedforward control computer device 702 (shown in FIG. 7). In other embodiments, process 1100 is performed by MC computer device 302 (shown in FIG. 3).

In the exemplary embodiment, feedforward control computer device 702 stores 1102 a build file 210 for building 212 (shown in FIG. 2) part 28 including one or more build parameters. For example, build parameters may include at least one of a power of laser device 14 (shown in FIG. 1), a scan speed of first scanning device 18, a desired melt pool size, and a desired melt pool temperature profile. Feedforward control computer device 702 receives 1104 a plurality of build information. Each set of build information includes sensor information of a build of part 28 by one of a plurality of systems 10 (shown in FIG. 1) using build file 210.

In the exemplary embodiment, feedforward control computer device 702 compares the plurality of sensor information to the one or more build parameters to determine one or more differences. For example, if the build parameter is the desired melt pool size, then the sensor information shows the actual melt pool size and feedforward control computer device 702 is able to determine the difference between the desired and the actual melt pool size. From the one or more differences, feedforward control computer device 702 determines 1108 one or more adjustments to the one or more build parameters to correct for the one or more differences.

For example, feedforward control computer device 702 compares 1106 the sensor information for four different builds 212 of part 28 on two different systems 10. Feedforward control computer device 702 determines differences for each of the builds based on the corresponding sensor information. Feedforward control computer device 702 compares the various differences to determine which differences show an issue with the build file 210, which differences only occur once (such as a one-time event), and which differences are specific to the system 10. Based on the differences that show an issue with the build file 210, feedforward control computer device 702 determines 1108 one or more adjustments to the one or more build parameters to correct and/or improve manufacture of part 28.

In the exemplary embodiment, feedforward control computer device 702 generates 1110 an updated build file 210 based on the one or more adjustments. Feedforward control computer device 702 transmits 1112 the updated build file 210 to at least one system 10 for manufacture.

In some embodiments, each set of build information also includes one or more real-time adjustments to the build parameters from the system 10 for that build 212. The one or more real-time adjustments were made by the system 10 during build 212 of part 28 through the use of feedback control 218 (shown in FIG. 2). Feedforward control computer device 702 compares the real-time adjustments from each build to the sensor information for the corresponding build 212. Feedforward control computer device 702 determines the one or more adjustments for the build parameter based on the comparison. For example, if every time that a system 10 builds a specific section the system 10 has to increase the power level to reach the desired melt pool size, then feedforward control computer device 702 determines 1108 one or more adjustments to correct this discrepancy.

In some embodiments, feedforward control computer device 702 determines one or more trends based on the comparison of the plurality of sensor information to the one or more build parameters. Examples of trends include, but are not limited to, persistent rates of change in one or more differences, persistent offset in one or more differences, and/or some other persistent observation. Feedforward control computer device 702 determines the one or more adjustments to the one or more build parameters based on the one or more trends.

In some embodiments, the plurality of build information includes build information from a first system 10 and a second system 10. Feedforward control computer device 702 determines which build information is associated with the first system 10 and which build information is associated with the second system 10. Feedforward control computer device 702 compares the two sets of build information to determine which differences from the build parameters are independent of the machine and which differences from the build parameters are associated with a specific machine. In some embodiments, feedforward control computer device 702 determines these differences based on trends over a plurality of builds 212. Feedforward control computer device 702 determines one or more adjustments to make based on the differences that are machine-independent. Feedforward control computer device 702 generates an updated build file 210 based on the machine-independent differences. Feedforward control computer device 702 also generates a first machine build file 210 specific to the first system 10 based on the updated build file 210 and the differences that are specific to the first system 10. Feedforward control computer device 702 further generates a second machine build file 210 specific to the second system 10 based on the updated build file 210 and the differences that are specific to the second system 10. Feedforward control computer device 702 transmits the first machine build file 210 to the first system 10 for use in building part 28. Feedforward control computer device 702 transmits the second machine build file 210 to the second system 10 for use in building part 28. Feedforward control computer device 702 transmits the updated build file 210 to any system 10 that does not have a machine specific build file 210.

In some embodiments, the build file 210 includes a plurality of geometries that each includes one or more values of a build parameter. Feedforward control computer device 702 compares the plurality of geometries to determine at least one subset of geometries that are similar. Feedforward control computer device 702 analyzes the one or more build parameters associated with each of the subset of geometries and the plurality of sensor information associated with each of the subset of geometries. Based on the comparison, feedforward control computer device 702 determines one or more updated build parameters for the subset of geometries. Feedforward control computer device 702 generates the updated build file 210 to include the one or more updated build parameters for each of the subset of geometries. For example, feedforward control computer device 702 analyzes every occurrence of a specific geometry across all builds 212 of part 28. Based on that analysis, feedforward control computer device 702 determines updated build parameters for the specific geometry. Feedforward control computer device 702 generates an updated build file 210, where each occurrence of the specific geometry is updated with the updated build parameters.

In some embodiments, the first build parameter is stored in build file 210 and the second build parameter is stored in a delta file. Where both build file 210 and delta file are transmitted to system 10 to manufacture part 28.

The above-described method and systems provides a method for dynamically adapting additive manufacturing of a part based on performance of builds of the part. Specifically, the embodiments described herein include a computing device that is configured to receive information about builds of the part and generate updated build files to improve the building of the part. The computing device uses sensor data to update the build file to improve the quality of the final part. The computing device breaks the build file apart into geometries, where a build file may include multiple copies of the same geometry, and updates each copy of the same geometry based on the previous builds of that geometry. In some embodiments, the computer device updates the build file in real-time while a part is being built. In other embodiments, the computer device updates the build file after the part is complete. The systems and method described herein allow for reducing the number of times that a part must be built to achieve an acceptable or ideal part.

An exemplary technical effect of the methods, systems, and apparatus described herein includes at least one of: (a) improving the build plan of a part; (b) reducing flaws in a part due to manufacturing; (c) determining and accounting for variations in different machines being used to manufacture a part; (d) reducing the number of iterations required to determine the proper settings for building a part; and (e) using lessons learned in building previous parts in building future parts.

Exemplary embodiments of methods, systems, and apparatus for dynamically adapting additive manufacturing of a part are not limited to the specific embodiments described herein, but rather, components of systems and/or steps of the methods may be utilized independently and separately from other components and/or steps described herein. For example, the methods may also be used in combination with other systems for manufacturing parts using a machine with plurality of inputs, and are not limited to practice with only the systems and methods as described herein. Rather, the exemplary embodiment can be implemented and utilized in connection with many other applications, equipment, and systems that may benefit from dynamic build files.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the build file, the finished component, and the build process from device details, sensors, post-manufacture inspection information, image data, and/or other data.

In one embodiment, a processing element may be trained by providing it with a large sample of build files and inspection information.

Based upon these analyses, the processing element may learn how to identify characteristics and patterns that may then be applied to analyzing sensor data, authentication data, image data, device data, and/or other data. For example, the processing element may learn to adjust manufacturing parameters based on specific geometries. The processing element may also learn how to identify different types of potentially difficult geometries for specific machines based upon differences in the received sensor data. The processing element may further learn how to prevent flaws from being introduced into the manufacture of a component. As a result, at the time of or prior to manufacture, providing updating build files adapted to the part, machine, and materials being used.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A manufacturing computer device for dynamically adapting additive manufacturing of a part, said manufacturing computer device comprising at least one processor in communication with at least one memory device, said at least one memory device stores a build file for building the part including a plurality of geometries that each include one or more values of a first build parameter, said manufacturing computer device configured to:

generate a model of a process of manufacturing the part, wherein the model simulates the process of manufacturing the part using an additive manufacturing machine;

execute a first simulation of the process of manufacturing the part using the model to generate the build file;

receive sensor information of a build of the part by the additive manufacturing machine using the build file generated by the first simulation;

receive inspection data of the part built using the build file;

compare the sensor information for each geometry of the plurality of geometries to the corresponding one or more values of the first build parameter of the build file generated by the first simulation to determine one or more differences;

adjust the model based on the determined one or more differences and the inspection data;

execute a second simulation of the process of manufacturing the part using the adjusted model to determine one or more values for a second build parameter for each of the geometries; and generate, using the adjusted model, an updated build file for the part including the one or more values for the second build parameter for a subsequent build of the part, wherein the updated build file includes the build file, which includes the first build parameter and a delta file including the second build parameter, wherein the delta file is used in conjunction with the build file for the subsequent build of the part.

2. The manufacturing computer device in accordance with claim 1, wherein said manufacturing computer device is further configured to:

receive subsequent sensor information from the subsequent build of the part using the updated build file;

compare the subsequent sensor information for each geometry of the plurality of geometries to the corresponding one or more values of the second build parameter to determine one or more additional differences;

determine one or more updated values for the second build parameter for each of the geometries based on the one or more additional differences;

generate a further updated build file for the part including the one or more updated values for the second build parameter; and transmit the further updated build file to the additive manufacturing machine.

3. The manufacturing computer device in accordance with claim 1, wherein said manufacturing computer device is further configured to:

receive one or more real-time adjustments to the first build parameter from the additive manufacturing machine, wherein the one or more real-time adjustments were made by the additive manufacturing machine while building the part; and determine the one or more values for the second build parameter for each of the geometries based on the one or more differences and the one or more real-time adjustments.

4. The manufacturing computer device in accordance with claim 1, wherein said manufacturing computer device is further configured to analyze the build file to determine the plurality of geometries that comprise the build file.

5. The manufacturing computer device in accordance with claim 4, wherein said manufacturing computer device is further configured to:

compare the plurality of geometries to determine at least one subset of geometries that are similar;

determine the one or more values for the second build parameter for one of the subset of geometries; and apply the determined one or more values to each occurrence of the subset of geometries in the updated build file.

6. The manufacturing computer device in accordance with claim 1, wherein the first build parameter includes at least one of a desired melt pool size and a desired melt pool temperature profile, and wherein the second build parameter includes at least one of a power of a laser device and a scan speed of a laser device.

7. The manufacturing computer device in accordance with claim 1, wherein the delta file includes changes made to the build file.

8. The manufacturing computer device in accordance with claim 1, wherein the sensor information is received from at least one of a photomultiplier tube, a photodiode, an infrared camera, a charged-couple device (CCD) camera, a CMOS camera, a pyrometer, or a high-speed visible-light camera.

9. The manufacturing computer device in accordance with claim 1, wherein the additive manufacturing machine configured to build the part based on the build file.

10. A method for dynamically adapting additive manufacturing of a part, said method implemented using a manufacturing computer device, the manufacturing computer device including a processor in communication with a memory, said method comprising:

generating a model of a process of manufacturing the part, wherein the model simulates the process of manufacturing the part using an additive manufacturing machine;

executing a first simulation of the process of manufacturing the part using the model to generate a build file;

storing the build file for building the part including a plurality of geometries that each include one or more values of a first build parameter;

receiving sensor information of a build of the part by the additive manufacturing machine using the build file generated by the first simulation;

receiving inspection data of the part built using the build file;

comparing the sensor information for each geometry of the plurality of geometries to the corresponding one or more values of the first build parameter of the build file generated by the first simulation to determine one or more differences;

adjusting the model based on the determined one or more differences and the inspection data;

executing a second simulation of the process of manufacturing the part using the adjusted model to determine one or more values for a second build parameter for each of the geometries;

generating, using the adjusted model, an updated build file for the part including the one or more values for the second build parameter for a subsequent build of the part; and transmitting the updated build file to the additive manufacturing machine;

wherein the updated build file includes the build file, which includes the first build parameter, and a delta file including the second build parameter, and wherein the delta file is used in conjunction with the build file for the subsequent build of the part.

11. The method in accordance with claim 10 further comprising:

receiving subsequent sensor information from a subsequent build of the part using the updated build file;

comparing the subsequent sensor information for each geometry of the plurality of geometries to the corresponding one or more values of the second build parameter to determine one or more additional differences;

determining one or more updated values for the second build parameter for each of the geometries based on the one or more additional differences;

generating a further updated build file for the part including the one or more updated values for the second build parameter; and transmitting the further updated build file to the additive manufacturing machine.

12. The method in accordance with claim 10 further comprising:

receiving one or more real-time adjustments to the first build parameter from the additive manufacturing machine, wherein the one or more real-time adjustments were made by the additive manufacturing machine while building the part; and determining the one or more values for the second build parameter for each of the geometries based on the one or more differences and the one or more real-time adjustments.

13. A system for dynamically adapting additive manufacturing of a part, said system comprising:

an additive manufacturing machine configured to build the part based on a build file;

a plurality of sensors configured to monitor building of the part; and a manufacturing computer device comprising at least one processor in communication with at least one memory device, said manufacturing computer device configured to:

generate a model of a process of manufacturing the part, wherein the model simulates the process of manufacturing the part using an additive manufacturing machine;

execute a first simulation of the process of manufacturing the part using the model to generate the build file;

store a build file for building the part including a plurality of geometries that each include one or more values of a first build parameter;

receive, from said plurality of sensors, sensor information of a build of the part by said additive manufacturing machine using the build file generated by the first simulation;

receive inspection data of the part built using the build file;

compare the sensor information for each geometry of the plurality of geometries to the corresponding one or more values of the first build parameter of the build file generated by the first simulation to determine one or more differences;

adjust the model based on the determined one or more differences and the inspection data;

execute a second simulation of the process of manufacturing the part using the adjusted model to determine one or more values for a second build parameter for each of the geometries;

generate, using the adjusted model, an updated build file for the part including the one or more values for the second build parameter for a subsequent build of the part; and transmit the updated build file to said additive manufacturing machine;

wherein the updated build file includes the build file, which includes the first build parameter, and a delta file including the second build parameter, and wherein the delta file is used in conjunction with the build file for the subsequent build of the part.

14. The system in accordance with claim 13, wherein said additive manufacturing machine is configured to build a subsequent part using the updated build file, wherein said manufacturing computer device is further configured to:

receive subsequent sensor information from a subsequent build of the part by said additive manufacturing machine using the updated build file;

compare the subsequent sensor information for each geometry of the plurality of geometries to the corresponding one or more values of the second build parameter to determine one or more additional differences;

determine one or more updated values for a second build parameter for each of the geometries based on the one or more additional differences;

generate a further updated build file for the part including the one or more updated values for the second build parameter; and transmit the further updated build file to said additive manufacturing machine.

15. The system in accordance with claim 13, wherein said additive manufacturing machine is configured to:

build a subsequent part using the updated build file;

receive sensor information from the plurality of sensors;

determine one or more real-time adjustments of the second build parameter based on the sensor information; and transmit one or more real-time adjustments of the second build parameter to said manufacturing computer device, wherein said manufacturing computer device is further configured to:

receive the one or more real-time adjustments to the second build parameter from said additive manufacturing machine; and determine one or more updated values for the second build parameter for each of the geometries based on the one or more differences and the one or more real-time adjustments.

* * * * *